(12) United States Patent
Lesi et al.

(10) Patent No.: US 12,120,212 B2
(45) Date of Patent: Oct. 15, 2024

(54) TIME RECOVERY IN A TIME SENSITIVE NETWORK

(71) Applicant: Intel Corporation, Santa Clara, CA (US)

(72) Inventors: Vuk Lesi, Cornelius, OR (US); Christopher Gutierrez, Hillsboro, OR (US); Manoj Sastry, Portland, OR (US); Christopher Hall, Portland, OR (US); Marcio Juliato, Portland, OR (US); Shabbir Ahmed, Beaverton, OR (US); Qian Wang, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 303 days.

(21) Appl. No.: 17/706,939

(22) Filed: Mar. 29, 2022

(65) Prior Publication Data

US 2022/0224501 A1    Jul. 14, 2022

(51) Int. Cl.
*H04L 7/00* (2006.01)
*H04J 3/06* (2006.01)

(52) U.S. Cl.
CPC .............. *H04L 7/0016* (2013.01); *H04J 3/06* (2013.01); *H04J 3/0673* (2013.01)

(58) Field of Classification Search
None
See application file for complete search history.

(56) References Cited

U.S. PATENT DOCUMENTS

| 6,011,823 A | * | 1/2000 | Bleiweiss | ............. | H04J 3/0632 |
| | | | | | 370/516 |
| 2022/0173884 A1 | * | 6/2022 | Mirabito | ............... | H04L 7/0037 |

FOREIGN PATENT DOCUMENTS

CN         112636859 A  *  4/2021  ............ H04J 3/0667

OTHER PUBLICATIONS

Translation of CN-112636859-A (Year: 2021).*

* cited by examiner

*Primary Examiner* — Robert M Morlan
(74) *Attorney, Agent, or Firm* — KDW Firm PLLC

(57) ABSTRACT

Time recovery techniques are described. A method comprises receiving messages from the first device by the second device in the first network domain, the messages to comprise time information to synchronize a first clock for the first device and a second clock for the second device to a network time, determining the second clock is to recover the network time for the second device without new messages from the first device, retrieving a first set of timestamps previously stored for events in the first network domain using the network time from the second clock, retrieving a second set of timestamps previously stored for the events in the first network domain using a redundant time from a third clock, where the third clock is not synchronized with the first and second clocks, and recovering the network time using a regression model and the redundant time from the third clock.

24 Claims, 19 Drawing Sheets

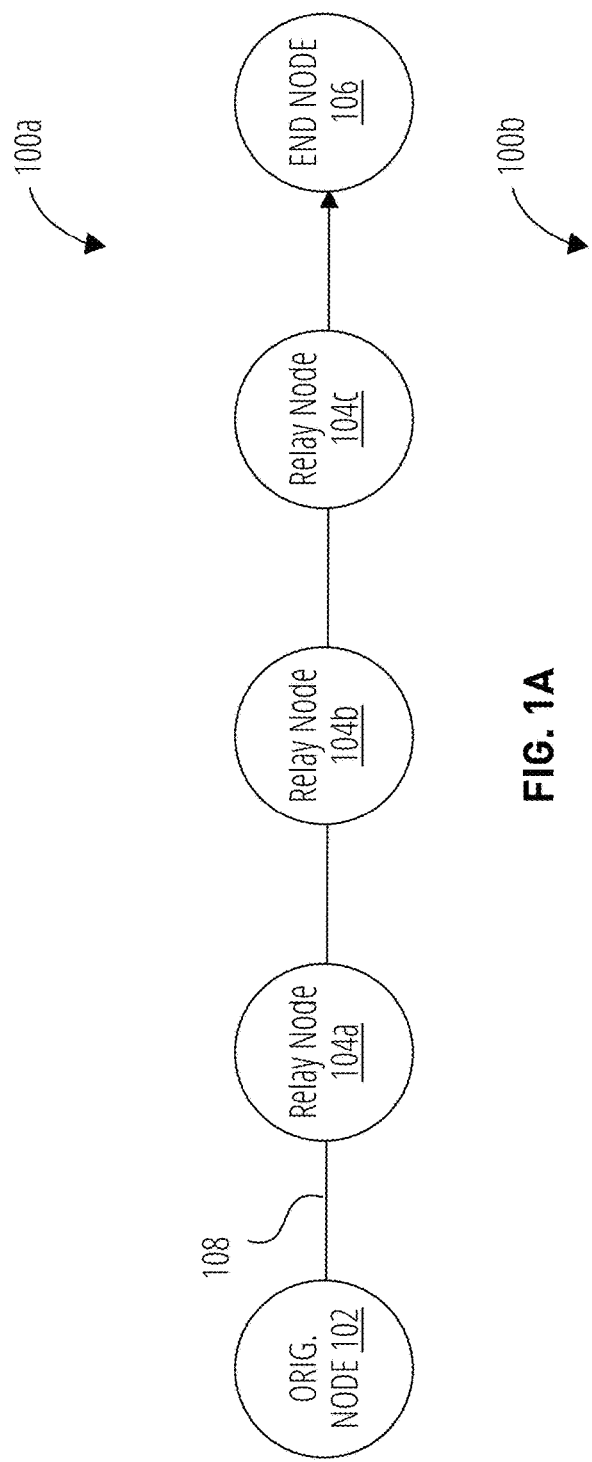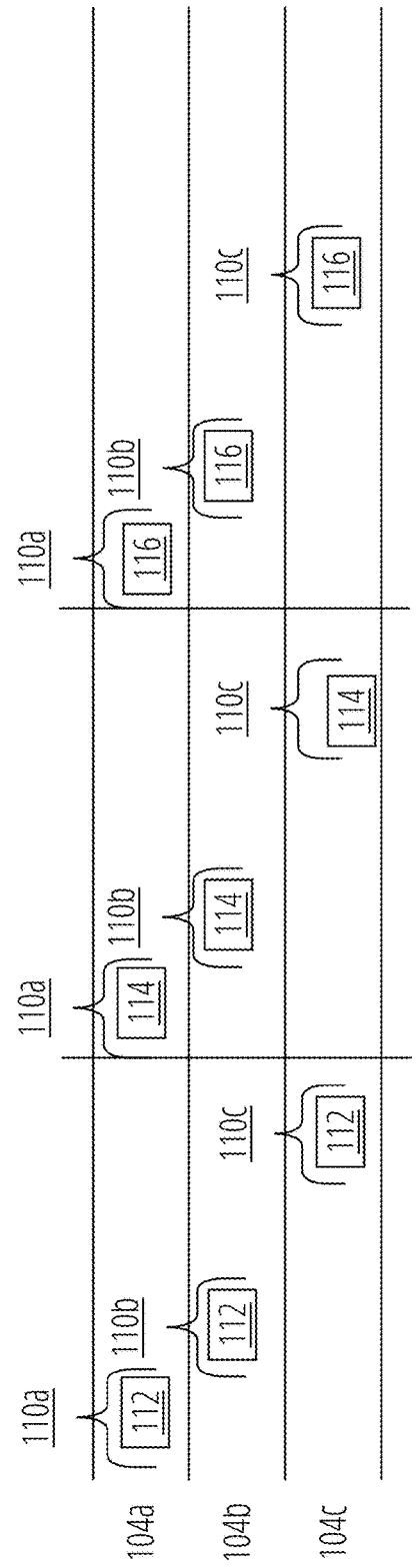

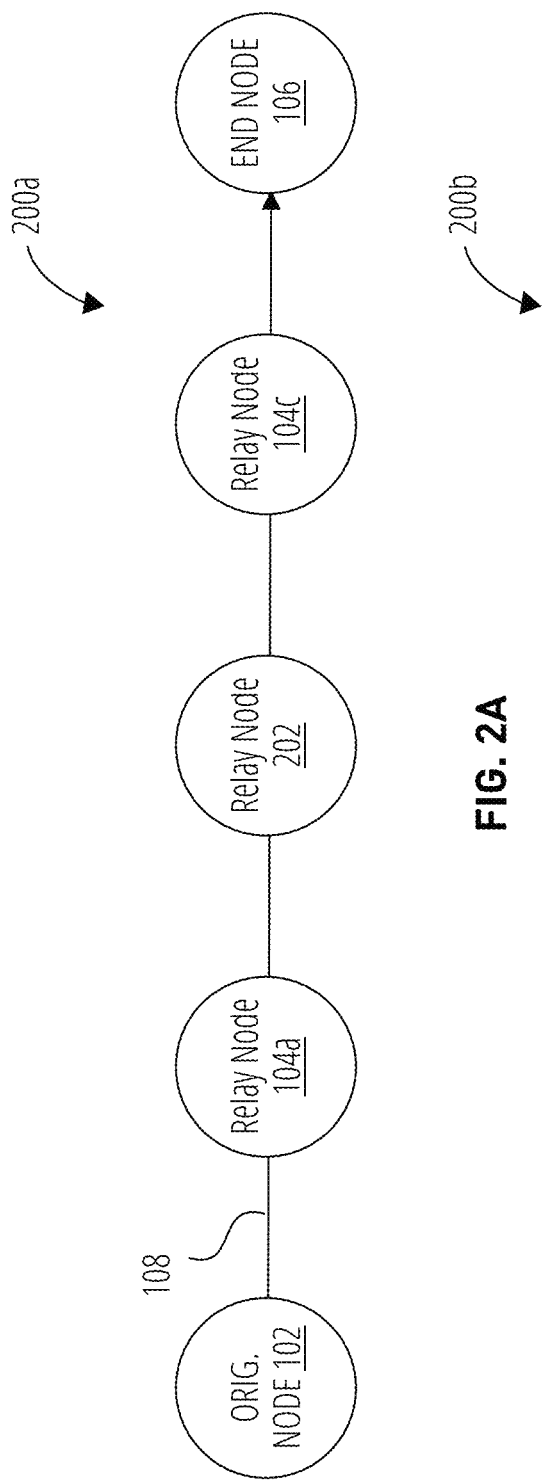
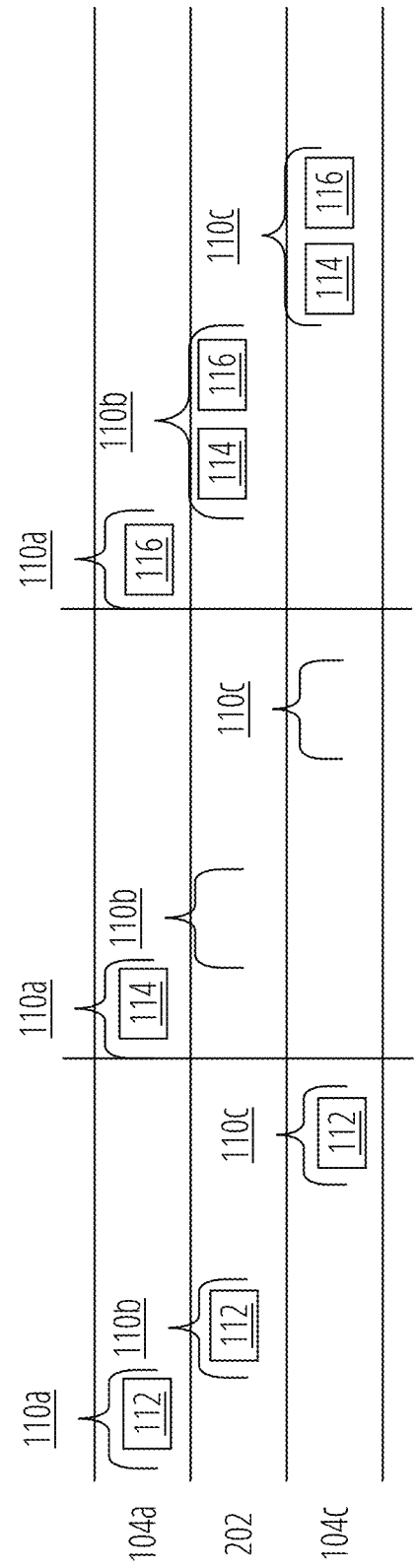
FIG. 2A
FIG. 2B

| Redundant Time | PTP time | Event |
|---|---|---|
| 0.000 | 0.003 | Sync |
| 1.000 | 1.006 | Sync |
| 2.000 | 2.009 | Sync |
| 3.000 | 3.012 | Sync |
| 4.000 | 4.015 | Sync |

TIME RECOVERY IN A TIME SENSITIVE NETWORK

BACKGROUND

Many computing systems require real-time safety critical features. For example, many autonomous systems, industrial systems, etc., require such systems to have real-time safety-critical features. This often necessitates that timekeeping performance within the system has higher levels of security relative to other aspects of the system. For example, factories employ synchronized robots to accomplish coordinated tasks, often in the presence of human beings. In another example, robots utilize coordination to perform surgeries on humans. As yet another example, self-driving vehicles require synchronization of networked sensing elements to build a precise perception of the environment around the vehicle, including other vehicles, objects, hazards, and persons. Tools relied on to achieve the necessary time performance, synchronization, and bounded latency communication for such time sensitive systems to perform as needed is often referred to as time-sensitive networking (TSN).

In general, TSN defines a set of standards (and amendments) with the aim to enable time synchronization and deterministic data delivery in converged networks where time-critical (TC) traffic coexists with other types of traffic. Thus, there is a need to provide security for TSN devices to mitigate the risks associated with disruption in TSN operation from attacks on the timing of the network.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1A illustrates a network 100a.
FIG. 1B illustrates a network 100b.
FIG. 2A illustrates a network 200a.
FIG. 2B illustrates a network 200b.
FIG. 3A illustrates a system 300a.
FIG. 4A illustrates a system 400a.
FIG. 5A illustrates a graph 500a.
FIG. 6A illustrates a table 600a.
FIG. 6B illustrates a graph 600b.
FIG. 7A illustrates a system 700a.
FIG. 13A illustrates an apparatus 1300a.
FIG. 13B illustrates an apparatus 1300b.

DETAILED DESCRIPTION

Figure 3A:
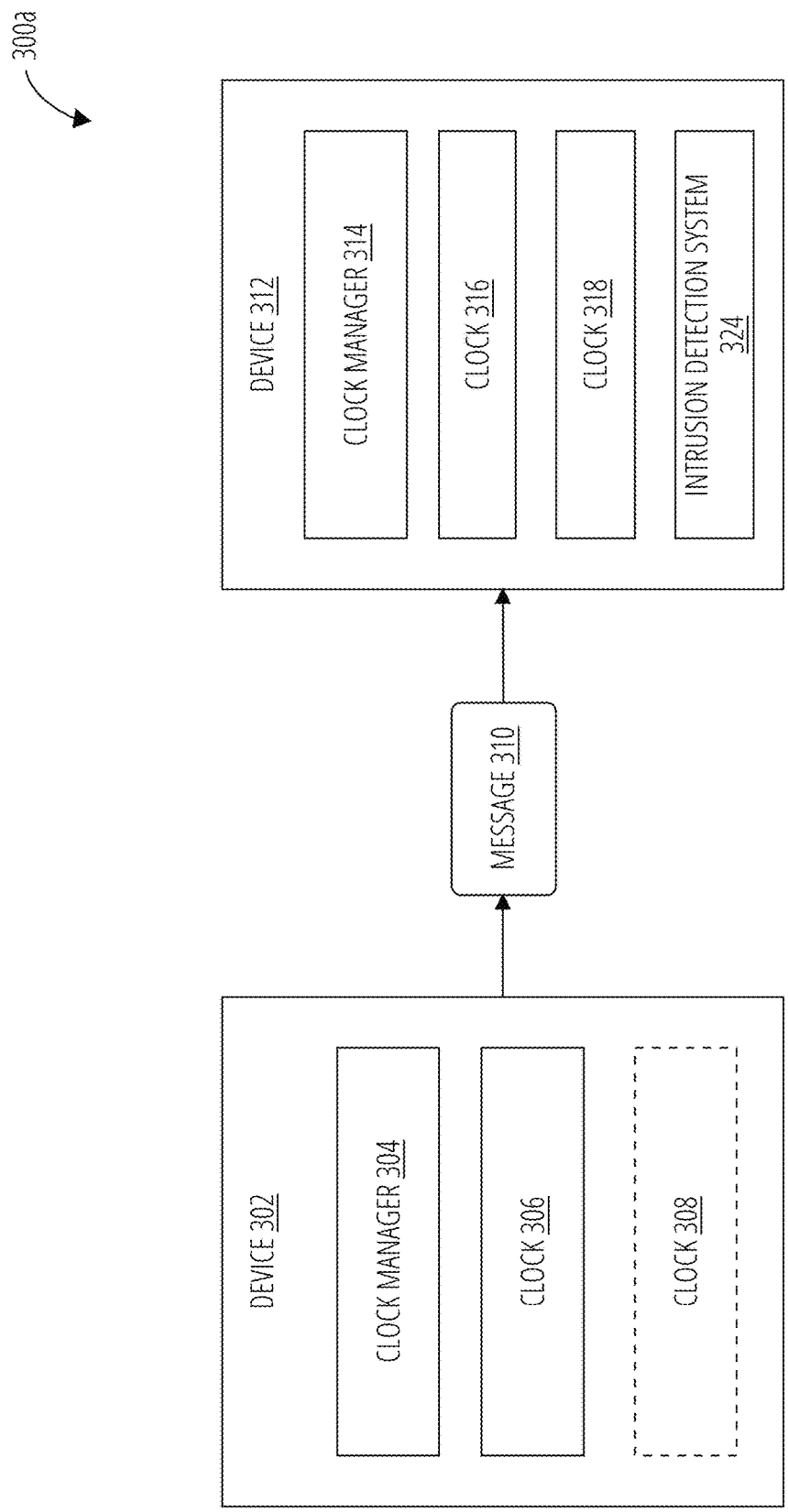

The present disclosure is generally directed to time management and recovery techniques for systems operating on strict time requirements, such as systems based on TSN. As noted, TSN defines a set of standards (and amendments) with the aim to enable time synchronization and deterministic data delivery in converged networks where TC traffic coexists with other types of traffic. Various standards have been developed to address time-sensitive communications. Three of the more prominent standards for enabling time-sensitive communications are promulgated by the Institute of Electrical and Electronics Engineers (IEEE). For example, IEEE 1588, IEEE 802.1AS and IEEE 802.1Qbv provide systems and methods for synchronizing device clocks. In particular, IEEE 1588 provides a protocol for time synchronization across a network; IEEE 802.1AS provides a protocol for time synchronization across a TSN, where time sensitive devices (e.g., clock followers) synchronize to a leader clock (e.g., clock leader); and IEEE 802.1Qbv provides for prioritizing TC traffic in the network switches using gate-controlled lists (GCLs).

In time sensitive networks, a clock leader may be compromised and a clock follower may need to recover a network time. For instance, if an attacker located on a network device (e.g., switch or relay) modifies a critical attribute on a specific port, then all downstream nodes from that network device will suffer a desynchronization event. Therefore, it becomes important to detect and localize an attack as quickly as possible. Furthermore, upon detection, it becomes important for the TSN to quickly isolate the compromised network device and thereby prevent the desynchronization attack from spreading to downstream nodes.

If a compromised network device is a clock leader, the clock followers downstream from the compromised clock leader will need to recover a network time without using any time information received from the compromised clock leader. In a TSN with one primary clock leader, for example, it may be necessary for a clock follower to take the primary clock leader role if an attack response causes disconnection of the primary clock leader. Further, applications that use incorrect time due to attack (e.g., logging) may need to be retroactively corrected.

Consider a scenario where a clock leader is under a time-based attack, such as a desynchronization attack to disrupt timing in a TSN. If a security response to the attack (e.g., node isolation) causes a loss of path to a clock leader, another network device in the TSN needs to assume the role of clock leader for one or more clock followers in the TSN. If the other network device does not have an alternate timekeeping source (e.g., a Global Positioning System), it needs to recover the correct time.

Additionally or alternatively, one or more clock followers may implement applications that used incorrect time while the attacker was present in the system. Applications typically keep log files of various application events with corresponding timestamps. One example of is logging/crowd-sourcing in autonomous and cyber-physical systems. Another example is a precision time protocol (PTP) hardware clock to system clock synchronization (PHC2SYS) propagation. The log files may have inconsistent entries and/or timestamps during or subsequent to the attack. The latter case may occur even when an intrusion detection system (IDS) prevents propagation of abrupt attacks, since less aggressive attackers may persist in the system for some time duration. In such cases, it becomes important to retroactively correct the incorrect timestamps before the logs are used, such as during a security review or threat detection in the case of autonomous or cyber-physical systems, or correcting the incorrect timestamps that PHC2SYS (in Unix-based systems) has propagated to system time, among other use cases.

For these and other threat scenarios, it becomes important to implement techniques for a network device to recover (or bootstrap) a network time to become a new clock leader for a TSN. It also becomes important to implement techniques to recover from inconsistencies in log files for applications executed by clock followers caused by the attack.

Embodiments attempt to solve these an other problems using a concept of redundant time implemented for a device, system or network. Sources for the redundant time may include, without limitation, a device having multiple clocks including a redundant or secondary clock for the device, a clock from another device in a same or different network domain (e.g., a multi-domain network), a model-based redundant clock, a global positioning satellite (GPS) system, a hardware clock, a software clock, and so forth. Embodiments are not limited in this context.

Embodiments use a novel concept of redundant time as a basis for techniques to recover a network time for a device, system or network. A technique of timestamp projection from a redundant clock or timeline to an extrapolated affected timeline enables recovery of current system time and past timestamps made by applications. The affected (synchronized) timeline is extrapolated using timestamps cleared by an intrusion detection system (IDS), based on a regression model. In addition to a network device having a primary time source, such as a primary internal clock synchronized to a common (or shared) network time, the network device can maintain (or have access to) an alternate or redundant time source. The redundant time source may be implemented as a secondary internal clock not synchronized to the network time. The redundant time source may be maintained by another device in the same network domain or an alternate network domain (e.g., a multi-domain TSN). The network device can then timestamp relevant events in both common network time and redundant time. In the event the common network time is affected by an attack, the redundant time will remain unaffected. Upon attack isolation, the unaffected redundant time can be used to recover a current network time without using any information from a clock leader. The unaffected redundant time can also be used to recover past (incorrect) timestamps by projecting timestamps from a redundant timeline to an interpolated/extrapolated network timeline.

In one embodiment, an apparatus to recover time in a TSN may include processing circuitry coupled to memory. The memory may store instructions that when executed by the processing circuitry causes the processing circuitry to perform various operations. The processing circuitry may establish or participate in a data stream between a first device and a second device in a first network domain, wherein the data stream includes a plurality of switching nodes, such as in a TSN. For example, the first device may be a clock leader (CL) device and the second device may be a clock follower (CF) device. The processing circuitry may receive messages from the first device by the second device in the first network domain. The messages may comprise time information to synchronize a first clock for the first device and a second clock for the second device to a network time for the TSN. At some point in time, the processing circuitry may determine the second clock is to recover the network time for the second device without new messages from the first device. For instance, the first device may be compromised due to a timing attack. The processing circuitry may enter a time recovery mode and retrieve a first set of timestamps previously stored for events in the first network domain using the network time from the second clock. The processing circuitry may retrieve a second set of timestamps previously stored for the events in the first network domain using a redundant time from a third clock, where the third clock is not synchronized with the first and second clocks. The processing circuitry may construct a regression model based on the first and second set of timestamps. For instance, the regression model may be implemented as a least-squares regression model, among other types of regression models. The processing circuitry may recover the network time of the first network domain using a redundant time from the third clock as input for the regression model to output a recovered network time for the second clock of the second device. The processing circuitry may also correct one or more timestamps for an application for the second device or another device in the first network domain using the regression model. Other technical features may be readily apparent to one skilled in the art from the following figures, descriptions, and claims.

FIG. 1A depicts a network 100a implemented according to a TSN standard (e.g., IEEE 1588, IEEE 802.1AS, IEEE 802.1 Qbv, or the like). As depicted, network 100a includes origination node 102, relay nodes 104a, 104b, and 104c, and end node 106, all communicatively coupled via communication channel 108. It is noted that the number of nodes in network 100a is selected for purposes of clarity and not limitation. In practice, network 100a can include any number and combination of nodes (e.g., origination nodes, switches, relay in nodes, end devices, etc.). Nodes in network 100a (e.g., origination node 102, relay node 104a, relay node 104b, and relay node 104c, etc.) are provided a GCL table, which specifies timing for windows in which the nodes can transmit packets on communication channel 108. It is also noted that the terms "switch node" and "relay node" are used interchangeably. For instance, the IEEE 802.AS defines protocol-aware switches as relays.

Relay nodes 104a, 104b, and 104c can be any number of devices in a network arranged to communicate, such as for example, electronic control units in an autonomous vehicle, an industrial system, a medical system, or the like. Additionally, communication channel 108 can be any of a variety of communication channels, including wired or wireless communication channels. In some implementations, all devices in network 100a will receive GCL tables. However, in some implementations, only origination nodes (e.g., origination node 102) and switching nodes (e.g., relay node 104a, etc.) receive GCL tables while destination devices (e.g., end node 106) do not receive a GCL table.

FIG. 1B depicts a timing diagram 100b depicting communication windows (e.g., Qbv windows, or the like) for switches of network 100a based on GCL tables. Typically, GCL tables are generated in a network controller (not shown) and are designed to prioritize TC traffic and prevent lower priority traffic from accessing communication channel 108, thus guaranteeing the timely delivery of TC packets within pre-configured time windows. In particular, timing diagram 100b depicts Qbv windows 110a, 110b, and 110c in which packets 112, 114, and 116 are transmitted. It is noted that the communication windows referred to herein are referred to as Qbv windows or protected windows for clarity. However, other standard or techniques for forming protected communication windows to facilitate time synchronization can be used besides Qbv windows. Examples are not limited in this context.

To facilitate transmission of packets (e.g., packet 112, etc.) during protected windows (e.g., Qbv window 110a, etc.), nodes in network 100a are time synchronized and scheduled to transmit TC packets (e.g., packet 112, etc.) using non overlapping protected windows (e.g., Qbv window 110a, etc.). It is to be appreciated that providing latency bounded communication (e.g., as depicted in timing diagram 100b) requires tight synchronization of time between nodes in network 100a. With such dependency on time synchronization, reliable TSN operation can be disrupted by attacking the timing of the network, sometimes referred to as a desynchronization attack or event.

FIG. 2A depicts a network 200a, which is like network 100a except that relay node 202 is depicted as compromised. In particular, the clock (not shown) of relay node 202 can be attacked and compromised, thereby causing the Qbv window 110b associated with relay node 202 to be misaligned with respect to, and even overlap with, the protected windows of the other switch nodes in the data stream path (e.g., along communication channel 108).

FIG. 2B depicts timing diagram 200b illustrating Qbv window 110b misaligned with Qbv window 110a and Qbv window 110c and overlapping with Qbv window 110a. As a result, packets (e.g., packet 114 in the figure) arrive too late with respect to the attacked switch protected window (e.g., Qbv window 110b) causing them to be buffered and sent in the next protected window. As a result of the delay in transmitting packet 114, relay node 202 breaks the latency bound of the stream that it is serving and can result in errors or comprise the safety of the system in which the nodes are operating FIG. 3A illustrates a system 300a that implements one or more TSN protocols or standards. The system 300a may comprise a device 302 and a device 312. The devices 302, 312 may be a subset of network devices suitable for operation within a TSN, such as networks 100a, 100b, 200a or 200b. The devices 302, 312 may be implemented as part of a vehicle, robot, industrial machine or any other devices suitable for a TSN. The devices 302, 312 may be implemented as an origination node 102, relay node 104a-104c, relay node 202 and/or end node 106. The devices 302, 312 may be implemented as either a clock leader (CL) or a clock follower (CF) in a TSN. The devices 302, 312 may include interfaces (not shown) to communicate information between each other, such as a message 310, for example.

The devices 302, 312 may operate in accordance with a timing protocol, such as a precision time protocol (PTP) for IEEE 1588 or IEEE 802.1AS. For instance, the devices 302, 312 may operate in accordance with IEEE 802.1AS which implements a hierarchical network to synchronize clock followers (CFs) to a clock leader (CL) through relays or switch nodes. Synchronization is performed through communication of time messages, such as the message 310. The time messages may comprise, for example, time synchronization messages or time update messages for a PTP. The time messages may include, among other fields and attributes, a correction_field, which accumulates a network residence, and an origin timestamp for a CL. The time message may also comprise, for example, a packet delay (pdelay) message type with additional fields and attributes as previously described.

In one aspect, the device 302 may be implemented as a clock leader for the TSN. The device 302 may include a clock manager 304 and a clock 306. The clock manager 304 may ensure that the clock 306 maintains a network time for the TSN. The clock manager 304 may send a message 310 with time information to one or more clock followers for the TSN, such as the device 312. The clock followers may use the time information from the message 310 to synchronize a local device time with the network time maintained by the clock 306. The device 302 may optionally include a clock 308, which can be used as a backup or redundant time source in case of failure or desynchronization of the clock 306.

In one aspect, the device 312 may be a clock follower for the TSN. The device 312 may also include a clock manager 314. The device 312 may include a clock 316. The device 312 may receive the message 310 from the device 302. The clock manager 314 of the device 312 may retrieve time information from the message 310, and use the time information to synchronize the clock 316 of the device 312 with the clock 306 of the device 302.

In addition to the clock 316, the device 312 may also include a clock 318. The clock 318 may be a redundant time source for the device 312. The device 312 may be used to recover a network time for the TSN in the event the device 302 is no longer available or compromised. The clock 318 may be implemented as a free-running monotonic clock that is not synchronized to the clock 306 of the device 302 or any other clock in the TSN. The second monotonic clock can be used for recovering a network time for the TSN since it cannot be influenced by the attacker 320 in a timing attack.

The device 312 may further include an intrusion detection system (IDS) 324. In general, the IDS 324 is a device or software application that monitors a device, network or systems for malicious activity or policy violations. The IDS 324 may be specifically tuned to detect a timing attack, such as a desynchronization attack, or other TSN specific attack vector. Any intrusion activity or violation is typically reported either to other devices in the same network, an administrator, and/or collected centrally using a security information and event management (SIEM) system. A SIEM system combines outputs from multiple sources and uses alarm filtering techniques to distinguish malicious activity from false alarms. In addition to the device 312, the IDS 324 may be implemented for other devices in the TSN, such as relay nodes 104a-104c, to provide a more comprehensive security solution to an attacker.

The IDS 324 can operate in an on-line or off-line mode. When operating in an on-line mode, the IDS 324 examines network traffic in real time. It performs an analysis of passing traffic on the entire subnet, and matches the traffic that is passed on the subnets to the library of known attacks. For instance, it analyses the message 310 (e.g., a TSN timing message) and applies some rules, to decide if it is an attack or not. Off-line mode typically deals with stored data and passes it through some processes to decide if it is an attack or not. For the offline case, a message may be replicated for offline analysis. It may be replicated in hardware without incurring a memory copy. However, a software solution may copy the message from the queue for later analysis. In either mode, once an attack is identified, or abnormal behavior is sensed, an alert can be sent to a SIEM, a network administrator, or a software application to automatically implement security protocols, such as dropping the message 310, isolating an infected device guarded by the IDS 324, and/or re-configuring one or more network paths for impacted devices in the TSN network.

The IDS 324 can utilize any number of different detection methods to detect an attack. For instance, the IDS 324 may implement a signature-based method, a statistical anomaly-based method, a stateful protocol analysis method, machine-learning based, or some combination of all four methods. A signature-based IDS monitors packets in the network and compares with pre-configured and pre-determined attack patterns known as signatures. A statistical anomaly-based or machine-learning based IDS monitors network traffic and compares it against an established baseline. The baseline will identify what is "normal" for that network, such as what sort of bandwidth is generally used and what protocols are used. For instance, ensemble models that use Matthews correlation co-efficient to identify unauthorized network traffic have obtained 99.73% accuracy. A stateful protocol analysis IDS identifies deviations of protocol states by comparing observed events with defined profiles of generally accepted definitions of benign activity. It will be appreciated that these detection methods are by way of example and not limitation. Other embodiments may use different detection methods as well. The embodiments are not limited in this respect.

Figure 3B:
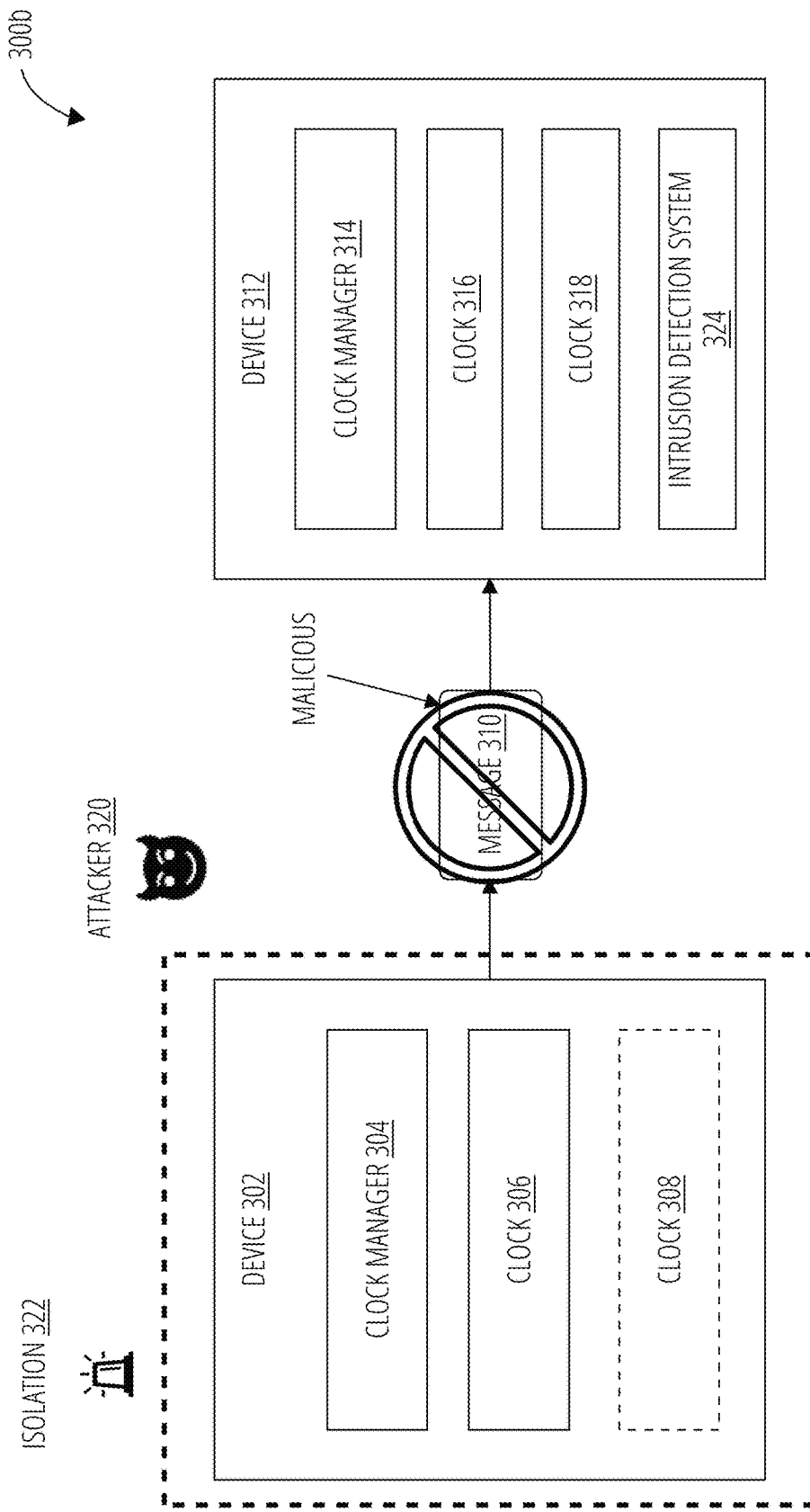
FIG. 3B illustrates a system 300b.

FIG. 3B illustrates a system 300b. The system 300b is similar to system 300a. The system 300b illustrates a threat scenario where the device 302 is under attack by an attacker 320. The attacker 320 attempts to spread or propagate the attack to other devices by modifying the message 310 to become a malicious message with false timing information. In response to the attack, the device 302 is placed in isolation 322 to prevent further spread of the attack to other devices in the TSN.

The device 312 may determine that the device 302 is isolated or under attack through direct notification by another network device in the TSN. For instance, another network device in the TSN may determine that the device 302 is under attack and all messages from the device 302 should be considered malicious, including the message 310. The network device can send an alert message to all neighboring nodes or network devices in the same network path as the device 302 indicating that the device 302 has been compromised and should be isolated. The device 312 may receive the alert message, and activate appropriate network security protocols to mitigate further spread of the attack in the TSN.

Additionally or alternatively, the device 312 may determine that the device 302 is isolated or under attack through indirect notification by inspection of the message 310 by the IDS 324 implemented by the device 312. The IDS 324 may be designed to inspect all messages, such as message 310, received by the device 312. If the message 310 is benign (e.g., safe or normal), the IDS 324 may update some parameters (e.g., a delay field, an inference field, pdelay field, etc.) for the message 310, and the device 312 can pass the message 310 to an egress queue for communication along a network path to another device in the TSN. If the message 310 is malicious (e.g., unsafe or corrupted), however, the IDS 324 can drop the message 310 or store it off-line for future security analysis. The device 312 can also take additional security measures, such as notifying a SIEM, activating a network reconfiguration protocol, sending alerts to neighboring devices in the TSN, and so forth.

When the IDS 324 determines the message 310 is malicious, the device 312 can disconnect from the device 302 to isolate itself from the attacker 320. Once disconnected, the device 312 will no longer receive or trust synchronization messages or update messages from the device 302, including the message 310. The clock manager 314 can enter a time recovery mode. In time recovery mode, the clock manager 314 assumes the clock 316 is no longer synchronized with a correct network time for the TSN, and it must therefore attempt to recover a correct network time without using any information from the compromised device 302, including the time information contained within the message 310. Time recovery can be accomplished using the clock 318, which is unsynchronized with the clock 306 of the device 302 or any other clock within the TSN.

Figure 4A:
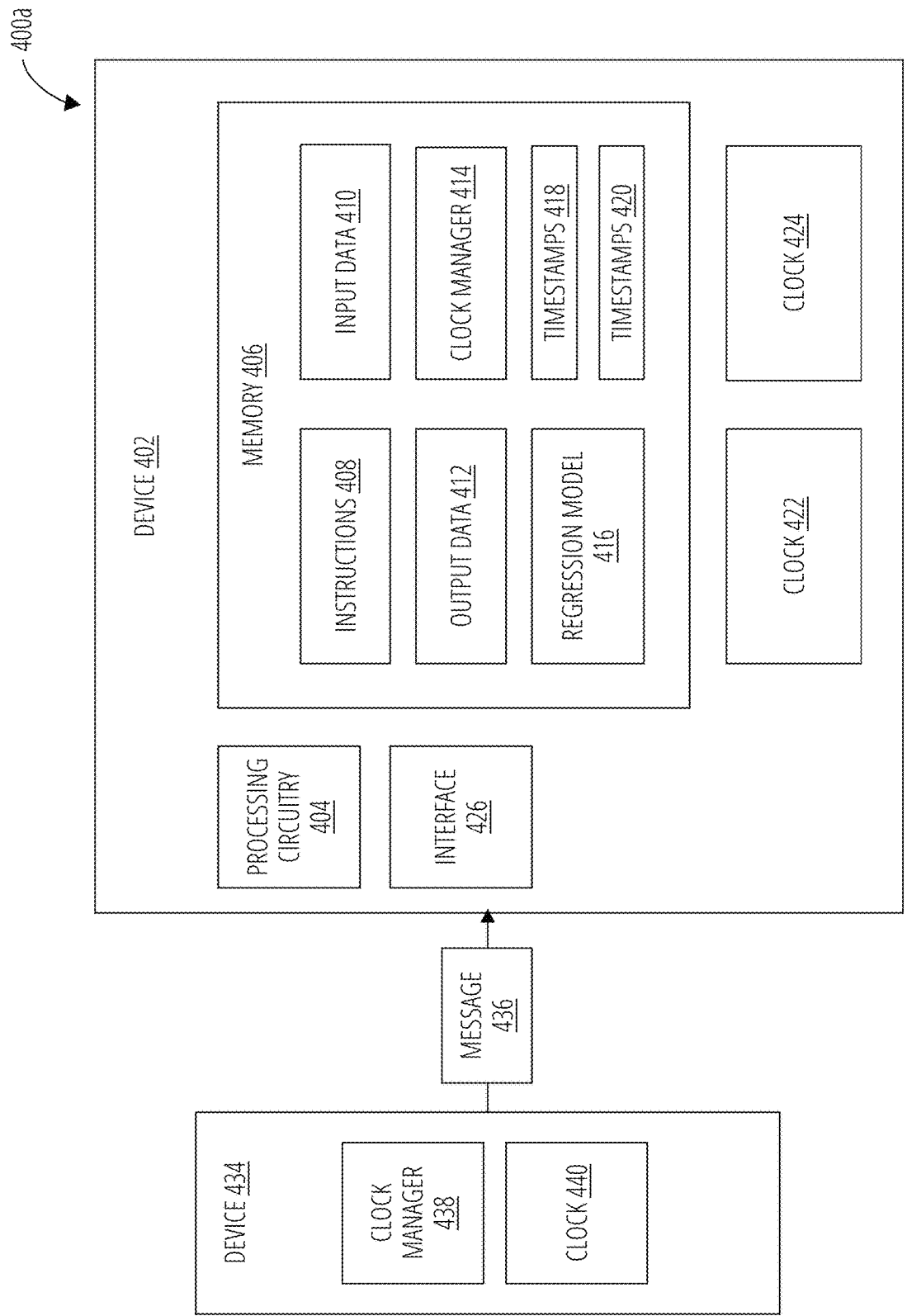

FIG. 4A depicts a system 400a. The system 400a may include a device 402 and a device 434. The device 402 is similar to the device 312 discussed with reference to FIGS. 3A, 3B. The device 434 is similar to the device 302 also discussed with reference to FIGS. 3A, 3B. The devices 402, 434 may communicate various messages between each other via a wired or wireless connection, as depicted by a message 436. The message 436 may be similar to the message 310 as previously described.

The device 402 provides a more detailed block diagram of components implemented for the device 312. The device 402 is representative of any number and type of devices, arranged to operate and process messages in a TSN network. More particularly, the device 402 includes a processing circuitry 404, an interface 426 and a memory 406. The memory 406 includes a set of instructions 408, input data 410, output data 412, a clock manager 414, a regression model 416, a first set of timestamps 418, and a second set of timestamps 420. The device 402 also includes a clock 422 and a clock 424.

The processing circuitry 404 may include circuitry or processor logic, such as, for example, any of a variety of commercial processors. In some examples, the processing circuitry 404 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processing circuitry 404 may include graphics processing portions and may include dedicated memory, multiple-threaded processing and/or some other parallel processing capability. In some examples, the processing circuitry 404 may be an application specific integrated circuit (ASIC) or a field programmable integrated circuit (FPGA). In some examples, the processing circuitry 404 may be circuitry arranged to perform computations related to TSN, such as switching, clock leader, clock follower, routing, security, and so forth.

The memory 406 may include logic, a portion of which includes arrays of integrated circuits, forming non-volatile memory to persistently store data or a combination of non-volatile memory and volatile memory. It is to be appreciated, that the memory 406 may be based on any of a variety of technologies. In particular, the arrays of integrated circuits included in memory 406 may be arranged to form one or more types of memory, such as, for example, dynamic random access memory (DRAM), NAND memory, NOR memory, or the like.

The interface 426 may include logic and/or features to support a communication interface. For example, the interface 426 may include one or more interfaces that operate according to various communication protocols or standards to communicate over direct or network communication links. Direct communications may occur via use of communication protocols or standards described in one or more industry standards (including progenies and variants). For example, the interface 426 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like. In some examples, interface 426 may be arranged to support wireless communication protocols or standards, such as, for example, Wi-Fi, Bluetooth, ZigBee, LTE, 5G, or the like.

The clock manager 414 and clocks 422, 424 are similar to the clock manager 314 and clocks 316, 318, respectively, as discussed with reference to device 312. The clock manager 414 generally manages time for the device 402. The clock manager 414 manages the clock 422 to synchronize the clock 422 to a shared or common network time for a network, such as a network time managed by the clock 440 of the device 434. This can be done via time messages, such as message 436, for example. The clock manager 414 also manages the clock 424. The clock 424 is a monotonic clock that is free-running and not synchronized to any other clock in the device 402 or another device in the TSN. In this manner, the clock 424 is effectively isolated and immune to an attack by the attacker 320. The device 402 uses the clock 424 to recover the shared or common network time for the TSN when the clock manager 414 deems the clock 422 is no longer reliable or unsafe, such as due to synchronization with an infected clock leader or unavailability of a normal clock leader, for example. When such events occur, the clock manager 414 may enter a time recovery mode in an attempt to recover the shared or common network time of the TSN.

When in time recovery mode, the clock manager 414 may utilize different sets of timestamps to assist in time recovery operations. In general, a timestamp is a sequence of characters or encoded information identifying when a certain event occurred, usually giving date and time of day, sometimes accurate to a small fraction of a second. This data is usually presented in a consistent format, allowing for easy comparison of two different records and tracking progress over time. Timestamps are typically used for logging events or in a sequence of events (SOE), in which case each event in the log or SOE is marked with a timestamp. In some cases, the timestamps conform to a standard, such as Geneva-based Organization for Standardization (ISO) 8601. ISO 8601 is an international standard covering the worldwide exchange and communication of date and time related data. The standard aims to provide a well-defined, unambiguous method of representing calendar dates and times in worldwide communications, especially to avoid misinterpreting numeric dates and times when such data is transferred between countries with different conventions for recording numeric dates and times.

The clock manager 414 may utilize a first set of timestamps 418. The timestamps 418 are timestamps generated and stored for certain events in the TSN using a network time from the clock 422. The event can be any type of network event, such as receiving a time message (e.g., PTP synchronization or update message) such as the message 436 from the device 434 operating as a clock leader for the device 402. When the device 402 receives a timing message from a clock leader, the clock manager 414 can receive time information from the clock 422 (e.g., year, month, day, hour, minutes, seconds, etc.), generate a timestamp for the message 436, and record the timestamp as part of timestamps 418.

The clock manager 414 may utilize a second set of timestamps 420. The timestamps 420 are timestamps generated and stored for the same events in the TSN as those used for the timestamps 418. Instead of using the clock 422, however, the timestamps 420 are generated using a redundant time from the clock 424, which is separate from and not synchronized with the clock 422 or any other clock in the TSN. Since the timestamps 420 utilize different time information as measured by the clock 424, the timestamps 420 are unlikely to be compromised or infected by a timing attack on a clock leader, which is assumed to be propagated to the clock 422. Therefore, the timestamps 420 can serve as a basis for recovering a network time for the TSN.

The clock manager 414 may recover the network time of the TSN using the redundant time from the clock 424 as input for a regression model 416 to output the recovered network time for the clock 422 of the device 402. The regression model 416 may be any type of regression model suitable for predicting or forecasting a network time based on the timestamps 418, 420. In statistical modeling, regression analysis is a set of statistical processes for estimating the relationships between a dependent variable and one or more independent variables. The most common form of regression analysis is linear regression, which finds a line that most closely fits the data according to a specific mathematical criterion. For example, the method of ordinary least squares computes the unique line that minimizes the sum of squared differences between the true data and that line. Less common forms of regression use slightly different procedures to estimate alternative location parameters (e.g., quantile regression or Necessary Condition Analysis) or estimate the conditional expectation across a broader collection of non-linear models (e.g., nonparametric regression). In one embodiment, the regression model 416 may be implemented as a least-squares regression model. Other linear and non-linear regression models may be implemented for regression model 416, however, such as Bayesian regression, percentage regression, least absolute regressions, non-parameter regressions, scenario optimization, distance metric learning, and so forth. Embodiments are not limited in this context.

Figure 4B:
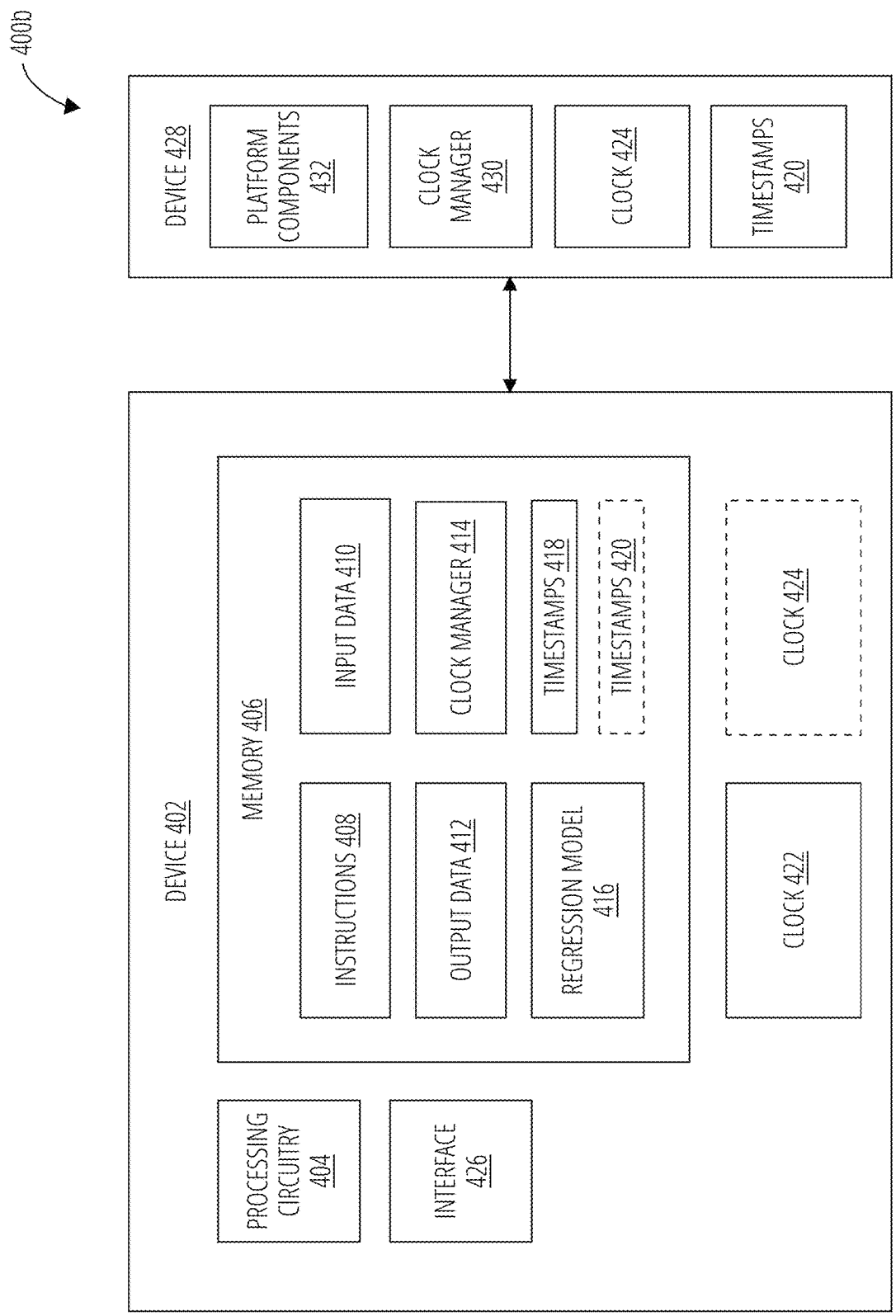
FIG. 4B illustrates a system 400b.

FIG. 4B illustrates a system 400b. System 400b includes the device 402 and a device 428 in communication with the device 402. In system 400b, the device 402 does not implement the clock 424 and it does not store any of the timestamps 420. Instead, the clock 424 and the timestamps 420 are implemented in the device 428 separate from the device 402. As shown in FIG. 4B, the device 428 in system 400b includes a set of platform components 432 that are similar to the processing circuitry 404, memory 406, and interface 426 implemented for device 402. The device 428 further includes a clock manager 430, the clock 424 and the timestamps 420. When the clock manager 414 enters a time recovery mode, it may communicate with the device 428 to access time maintained by the clock 424 and the timestamps 420 stored on the device 428. This configuration may be suitable when the device 402 has limited resources, such as industrial devices, medical devices, wearable devices, mobile devices, Internet of Things (IoT) devices, and so forth. This configuration may also provide an additional level of security to ensure the redundant time source and/or timestamps remain isolated from a time attack.

In operation, assume system 400a establishes or participates in a data stream between a first device 434 and a second device 402 in a first network domain of a TSN, wherein the data stream includes a plurality of switching nodes 104a-104c, such as in the networks 100a, 100b, 200a and/or 200b. For example, assume the first device 434 is a clock leader (CL) device and the second device 402 is a clock follower (CF) device within the first network domain of the TSN. The processing circuitry 404 of the second device 402 may receive the message 436 from the first device 434 in the first network domain. The message 436 may include time information to synchronize a first clock 440 for the first device 434 and a second clock 422 for the second device 402 to a network time for the TSN. The processing circuitry 404 may execute instructions for the clock manager 414 stored in the memory 406 to perform time synchronization operations. Alternatively, the clock manager 414 may be a hardware controller that implements some or all of the processing circuitry 404 of the device 402.

At some point in time, the processing circuitry 404 may determine the second clock 422 is to recover the network time for the second device 402 without new messages 436 from the first device 434. For instance, assume the first device 434 is compromised due to a timing attack. The processing circuitry 404 may enter a time recovery mode and retrieve a first set of timestamps 418 previously stored for events in the first network domain using the network time from the second clock 422. The processing circuitry 404 may retrieve a second set of timestamps 420 previously stored for the events in the first network domain using a redundant time from a third clock 424, where the third clock 424 is not synchronized with the first and second clocks 440, 422. The processing circuitry 404 may construct (or retrieve from the memory 406) a regression model 416 based on the first and second set of timestamps 418, 420. For instance, the regression model 416 may be implemented as a least-squares regression model. The processing circuitry 404 may recover the network time of the first network domain using a redundant time from the third clock 424 as input for the regression model 416 to output a recovered network time for the second clock 422 of the second device 402.

The operations of the device 402 while in time recovery mode may be further described in more detail with reference to various examples given in FIGS. 5-6. It may be appreciated that the examples given in FIGS. 5-6 are by way of example only and not limitation.

Figure 5A:
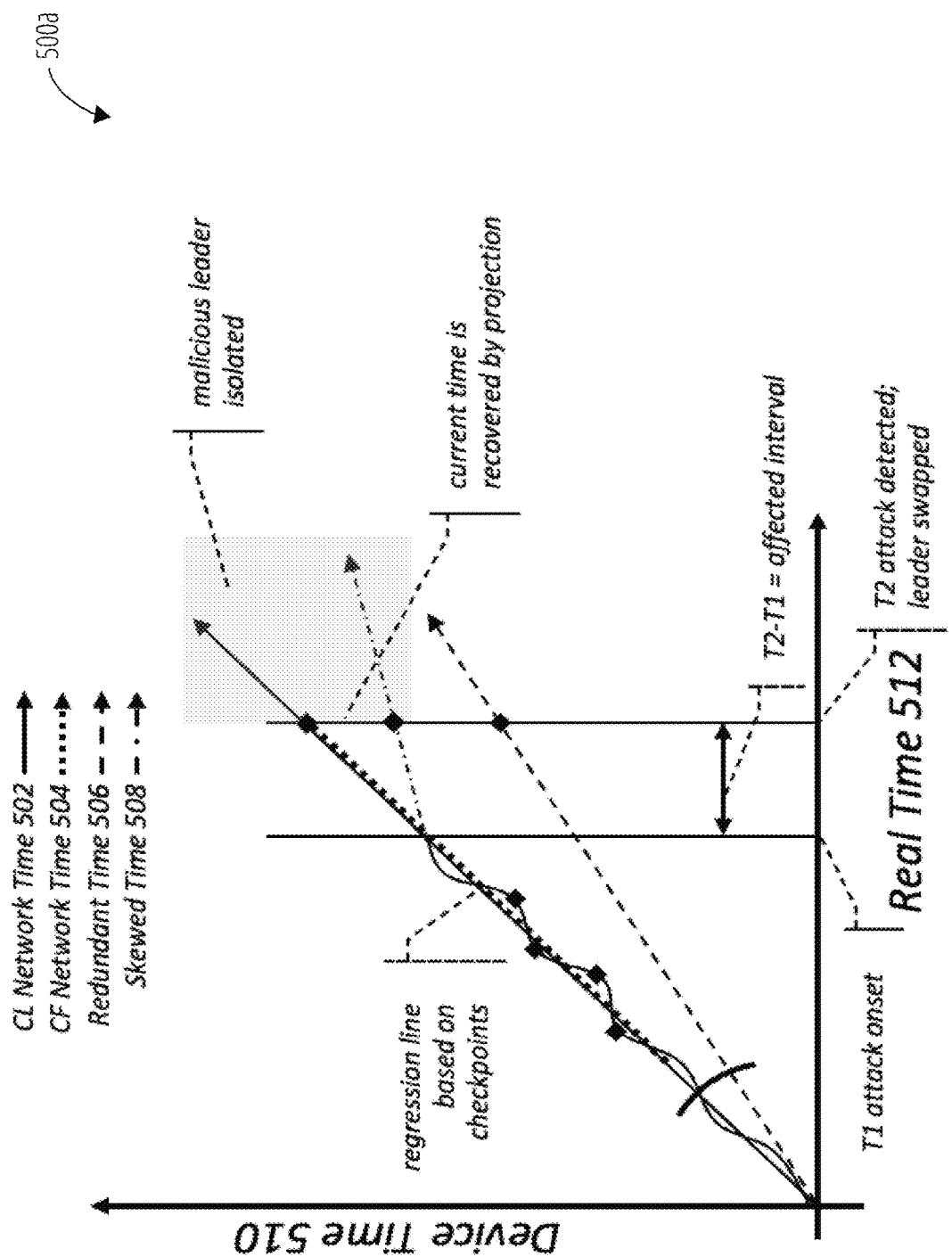

FIG. 5A illustrates a graph 500a. The graph 500a illustrates a real time 512 along an x-axis and a device time 510 along a y-axis. The graph 500a depicts various timelines, including a clock leader (CL) network time 502, a clock follower (CF) network time 504, a redundant time 506, and a skewed time 508.

The CL network time 502 illustrates a timeline for a CL, such as a timeline maintained by the clock 440 of the device 428. As depicted in FIG. 5A, the CL network time 502 represents a network time that progresses under normal operation of a TSN without disruptions caused by an attacker 320 on any devices within the TSN. At time T1, assume an attacker 320 initiates a timing attack on the device 434. At time T2, the device 402 detects the timing attack on the device 434, and enters a time recovery mode to recover the CL network time 502 and operate as a new CL for the TSN. The interval of time between T1 and T2 is a period of time where the network time maintained by the clock 422 of the device 402 is potentially affected and no longer valid, which may be referred to herein as an "affected interval" or "affected interval T2–T1." The affected interval is represented as the skewed time 508 in the graph 500a.

The CF network time 504 illustrates a timeline for a CF, such as a timeline maintained by the clock 422 of the device 402. The CF network time 504 approximately follows the CL network time 502 during normal operations of the TSN without disruptions caused by the attacker 320 on any devices within the TSN. However, the CF network time 504 is disrupted for the same interval of time between T1 and T2, as indicated by the divergence between the CL network time 502 and the CF network time 504. As such, the clock manager 414 of the device 402 needs to recover a current network time by projection using the redundant time 506 and a regression timeline based on time checkpoints calculated from timestamps 418 and/or timestamps 420. Since the timestamps 418, 420 are based on a time maintained by the clocks 440, 424 before the affected interval T2–T1, the time checkpoints calculated from the timestamps 420 can be used to construct a regression timeline. The clock manager 414 can calculate the regression timeline using the regression model 416. An example of the regression model 416 can include a least-squares regression model, although other regression models may be used as well. It is worthy to note that the least squares regression technique assumes the network induces uniform noise in the checkpoints. If other evidence is available, the regression algorithm can be adjusted to provide a higher-fidelity timeline for a given implementation.

The redundant time 506 illustrates a timeline for a redundant clock, such as the clock 424 implemented by the device 402. The redundant time 506 is maintained by the clock 424. Since the clock 424 is a monotonic clock that is free-running without synchronization to either of clocks 440, 422, it should remain unaffected by the attacker 320. As such, the redundant time 506 is not modified or skewed during the affected interval T2–T1. The clock manager 414 can obtain a recovered current time sometime after time period T2 when the malicious CL device 434 is isolated by projecting a current unaffected time of the redundant time 506 to the erroneous CF network time 504, and from the erroneous CF network time 504 to an extrapolated linear timeline represented by the CL network time 502.

It is worthy to note that although the clock 424 is not synchronized to either of clocks 440, 422, the clock 424 and the clock 440, as represented by respective timelines for the redundant time 506 and the CL network time 502, should have a rate ratio that is approximately constant or with a predictable drift. The rate ratio may be linear or non-linear depending on the type of clocks implemented by the devices 402, 434.

Figure 5B:
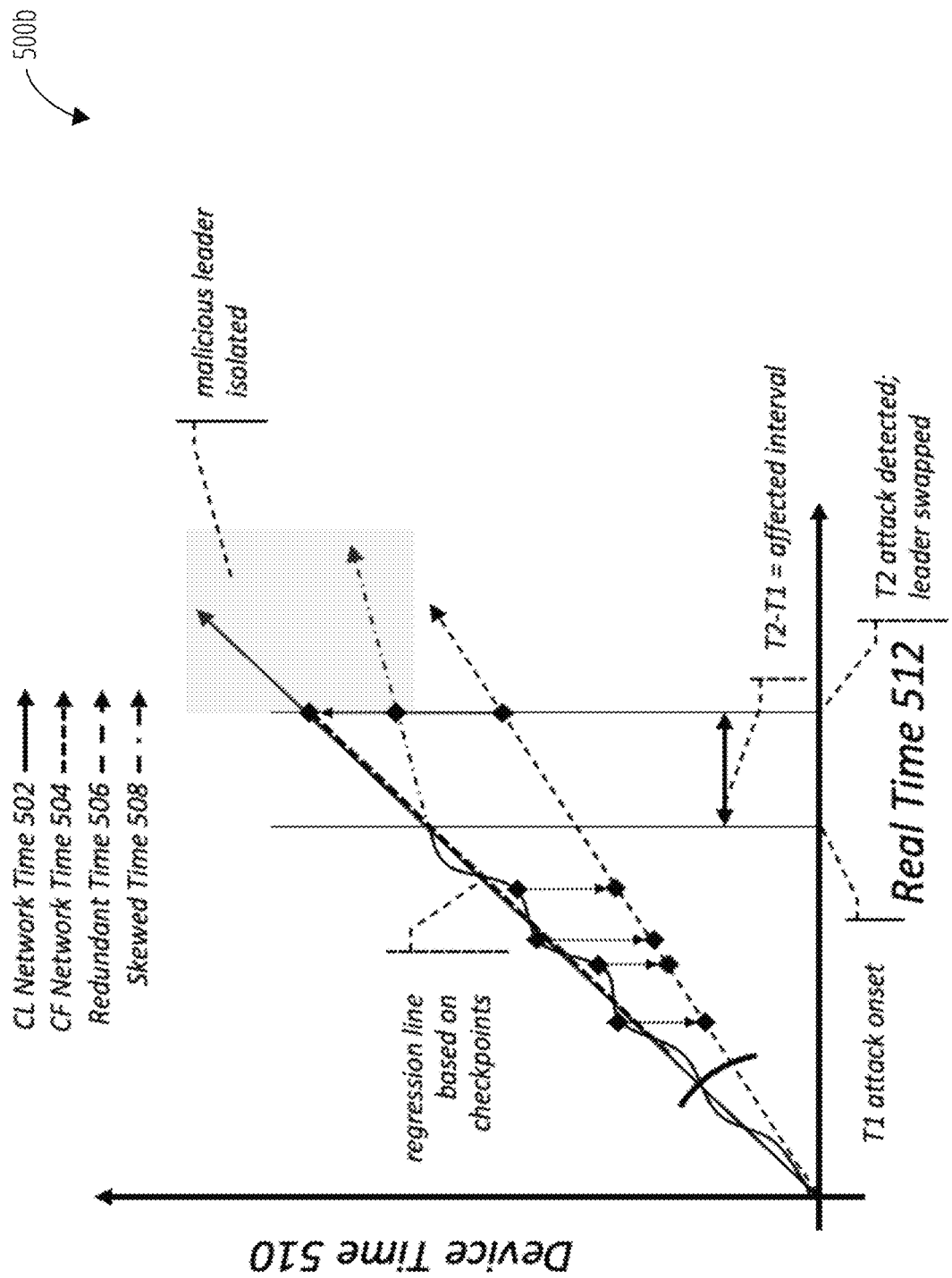
FIG. 5B illustrates an aspect of the subject matter in accordance with one embodiment.

FIG. 5B illustrates a graph 500b that is similar to graph 500a. The graph 500b depicts a series of checkpoints (black diamonds) for both a regression timeline and the redundant time 506. The checkpoints should be cleared to remove any security concerns, such as by an IDS or guaranteed benign by a SIEM. Since the real time 512 of the x-axis is in practice unknown by the clock follower device 402, a relative least-squares regression timeline can be used to approximate or estimate the CL network time 502, and the redundant time 506 can be projected onto the estimated CL network time 502 via the checkpoints. This checkpoint technique is further described with examples from FIGS. 6A-6D.

Figures 6A, 6B:
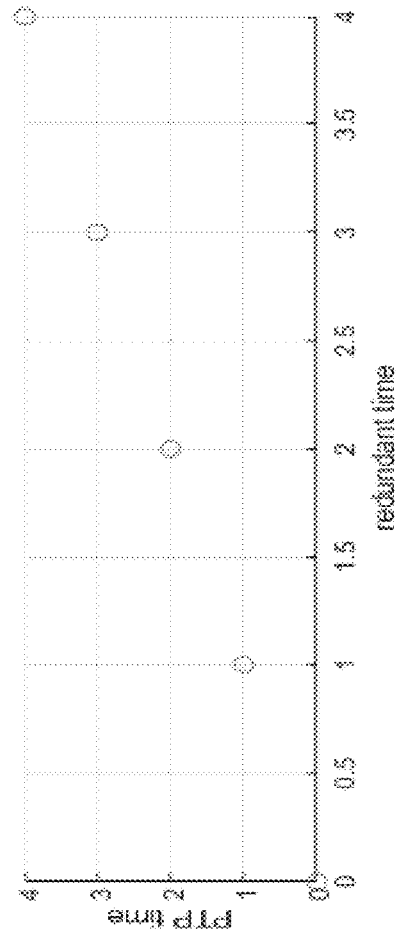

FIG. 6A illustrates a table 600a. The table 600a includes a series of timestamps 420 based on a redundant time from the clock 424, a series of timestamps 418 based on a network (PTP) time from the clock 422, and a series of events for which the timestamps 418, 420 are generated, which in this case are synchronization events that occur upon receipt of the messages 436 by the device 402. The table 600a includes values calculated when the device 402 of the TSN operates under normal conditions (benign) prior to the time interval T1 when the attack begins.

As shown in table 600a, a series of checkpoints 602-610 correspond to rows 2-6, respectively, in the table 600a. A first checkpoint 602 has a redundant time of 0.000 and a corresponding network (PTP) time of 0.003 for a first synchronization (sync) event. A second checkpoint 604 has a redundant time of 1.000 and a corresponding network (PTP) time of 1.006 for a second sync event. A third checkpoint 606 has a redundant time of 2.000 and a corresponding network (PTP) time of 2.009 for a third sync event.

FIG. 6B illustrates a graph 600b. The graph 600b depicts a redundant time from the clock 424 along an x-axis and a network (PTP) time along a y-axis. As shown in the table 600a, the rate ratio between the redundant time and the network (PTP) for the checkpoints 602, 604, 606 remains consistently at 0.003. Graph 600*b* illustrates various points that show the linear relationship between the redundant time and the network time (not accounting for drift) before the time interval T1 when the attack begins.

Figure 6C:
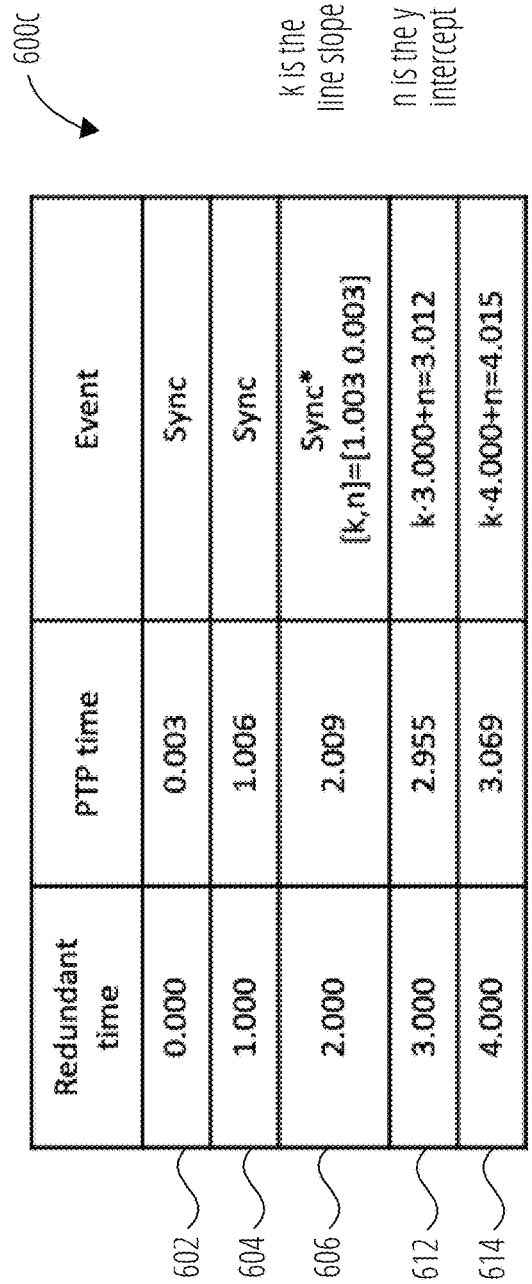
FIG. 6C illustrates a table 600c.

FIG. 6C illustrates a table 600*c*. Similar to the table 600*a*, the table 600*c* includes a series of timestamps 420 based on a redundant time from the clock 424, a series of timestamps 418 based on a network time from the clock 422, and a series of events for which the timestamps 418, 420 are generated, which in this case are synchronization events that occur upon receipt of the messages 436 by the device 402. Unlike the table 600*a*, however, the table 600*c* includes values calculated when the device 402 of the TSN operates under abnormal conditions (malicious) during the time interval T1 to T2 when the attack occurs.

As shown in the second column of the table 600*c*, certain network (PTP) times under attack conditions are different from the network times shown in the second column of the table 600*a* under benign conditions. More particularly, the checkpoints 612, 614 shown in table 600*c* have different values from the checkpoints 608, 610 shown in table 600*a*. For instance, the checkpoint 608 has a redundant time 3.000 and a corresponding network time of 3.012 for the sync event shown in row 5 of the table 600*a*. The network time of 3.012 represents the real time 512 of the TSN. However, the checkpoint 612 has a redundant time 3.000 and a corresponding network time of 2.955 for the same sync event shown in row 5 of the table 600*c*. The network time of 2.955 represents a deviation from the real time 512 (or a false time) of the TSN caused by the attack on the CL device 434 during the affected interval T2-T1. The checkpoint 614 also has a different network (PTP) time from the checkpoint 610, notably 3.069 versus 4.015, respectively.

To find the real time 512 of the TSN, the clock manager 414 can use the regression model 416. The clock manager 414 can use the timestamps 418, 420 to calculate parameters for the regression model 416. Continuing with the previous example, the clock manager 414 uses the checkpoints 602, 604, 606 retrieved or calculated from the timestamps 418, 420 in rows 2-4 of the table 600*c* to derive a value for k of 1.003 and a value for n of 0.003, where k represents a line slope and n represents a y intercept. To find the correct or recovered network time of the TSN for the redundant time 3.000 shown for the checkpoint 612 in row 5 of the table 600*c*, the clock manager 414 uses the parameters [k, n]= [1.003 0.003] along with the redundant time 3.000 as inputs to Equation 1, which is: k×3.000+n=1.003×3.000+ 0.0003=3.012. The correct or recovered network time as calculated by the clock manager 414 matches the network time of 3.012 shown for the checkpoint 608 in row 5 of the table 600*a*.

Figure 6D:
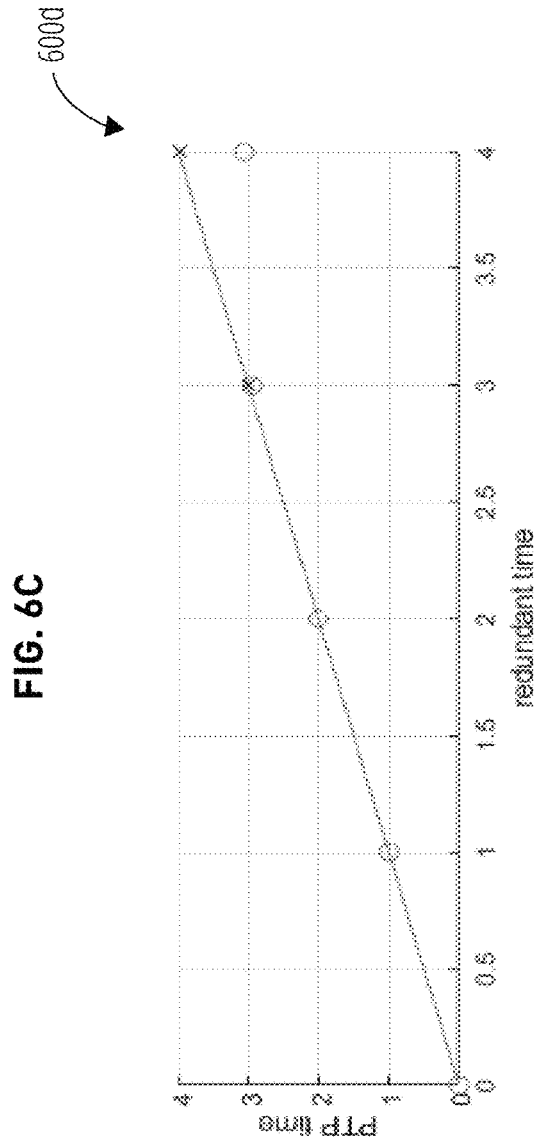
FIG. 6D illustrates a graph 600d.

FIG. 6D illustrates a graph 600*d*. The graph 600*d* depicts a redundant time from the clock 424 along an x-axis and a network time along a y-axis. As shown in graph 600*d*, the linear relationship between the redundant time and the network time are skewed during the affected interval T2-T1 when the attack occurs. In graph 600*d*, however, the clock manager 414 uses the regression model 416 and the timestamps 418, 420 to calculate a timeline that approximates the real time 512 shown by the CL network time 502, with corrections made for the erroneous network times 2.955 and 3.069 to correct network times 3.012 and 4.015, respectively. The recovered CL network time 502 can then be used to project a current network time for the device 402 after time period T2 when the device 434 is isolated and the device 402 assumes the CL role from the device 434 for the first network domain of the TSN.

Upon attack isolation, the unaffected redundant time can be used to recover a current network time without using any information from a clock leader. The unaffected redundant time can also be used to recover past (incorrect) timestamps by projecting timestamps from a redundant timeline to an interpolated/extrapolated network timeline. This technique may be described in more detail with reference to FIGS. 7-9.

Figure 7A:
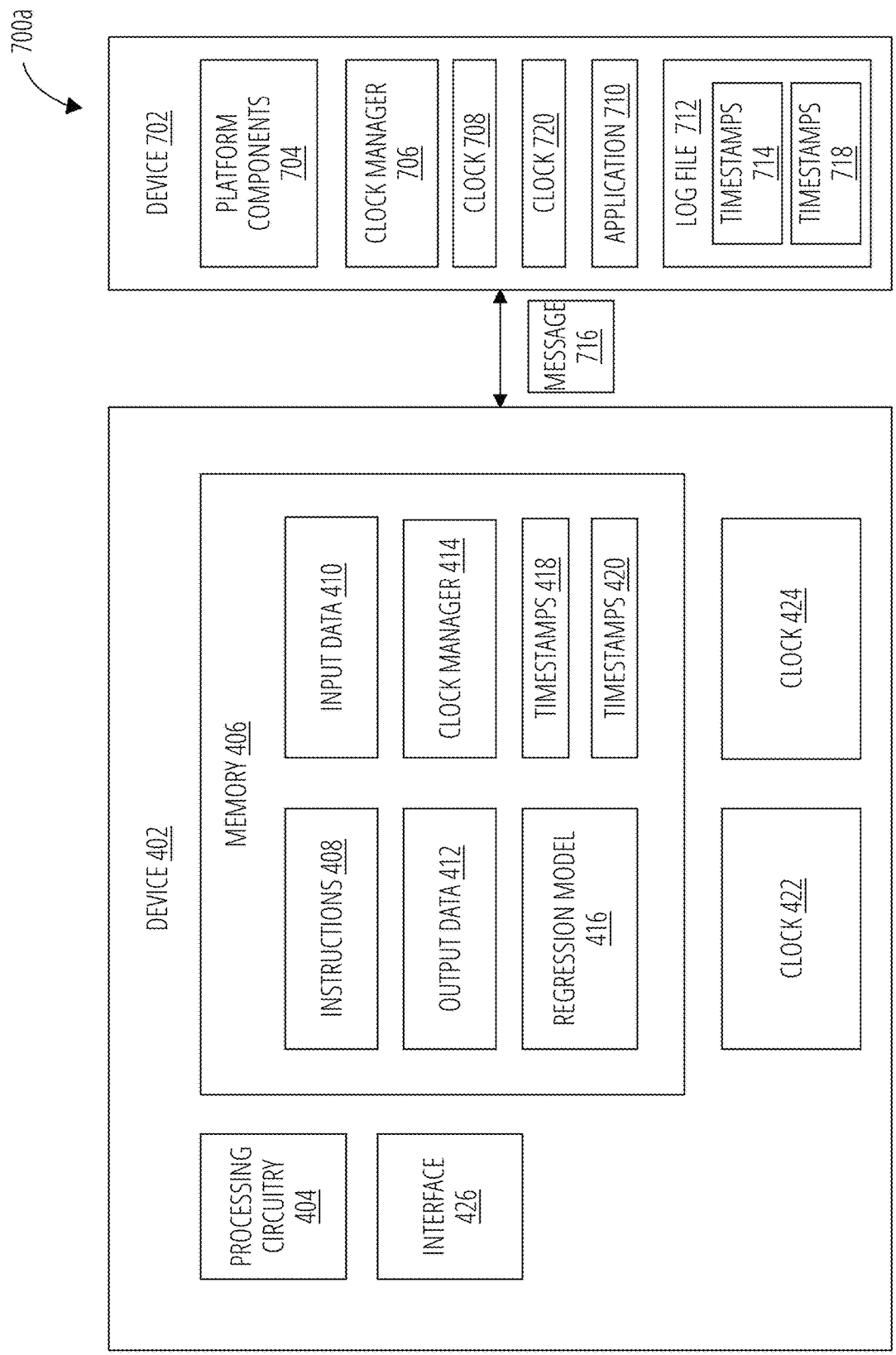

FIG. 7A illustrates a system 700*a*. System 700*a* includes the device 402 as described with reference to FIGS. 4A, 4B. System 700*a* further includes a device 702. The device 702 is similar to the device 402 in that it is a device a network operable in accordance with one or more time-based standards, such as in a TSN network. The device 702 may comprise, for example, a clock follower device that is downstream from the device 702 in a TSN. Once the device 402 recovers a network time and becomes a new clock leader, the device 702 can become a clock follower of the device 402. The device 402 can send time messages 716 to the device 702 so that it may synchronize the clock 708 to the current network time for the network as recovered by the device 402.

As shown in FIG. 7A, the device 702 includes platform components 704, a clock manager 706, and a clock 708. These components are similar to the components of the device 428 as described with reference to FIG. 4B. The device 702 further includes a second clock 720. The second clock 720 is similar to the clock 424 of the device 402 as described with reference to FIG. 4A. The clock 720 is a monotonic clock or counter that is free-running and not synchronized to any other clocks in the device 702 or other devices in the same TSN.

In addition, the device 702 includes an application 710 and a log file 712 storing timestamps 714 for certain events of the application 710. The application 710 may periodically log timestamps 714 for events that occur for the application 710, such as application updates, checkpoints, temporary files, application access, user identifiers, and so forth. The application 710 generates the timestamps 714 using the clock 708, which is synchronized to a network time (e.g., with clock 306 or clock 422) via time messages. The application 710 may also log a set of timestamps 718 corresponding to the same events for which the set of timestamps 714 were generated. The application 710 generates the timestamps 420 using the clock 720, which is free-running and not synchronized to a network time (e.g., with clock 306, clock 422 or clock 708).

When the application 710 performs timestamp operations under normal operating conditions (e.g., benign), such as prior to time T1, the timestamps logged using a network time from the clock 708 should be relatively accurate and therefore do not require any modifications. During an affected interval T2-T1 when the application 710 performs timestamp operations under compromised operating conditions (e.g., malicious), however, the application 710 may log incorrect timestamps from the clock 708, since the clock 708 is synchronized to a network time kept by the clocks 306, 422, which are skewed and no longer accurate due to the time attack. Consequently, a need arises to correct the application timestamps 714 made during the affected interval T2-T1 with a corrected network time.

Figure 7B:
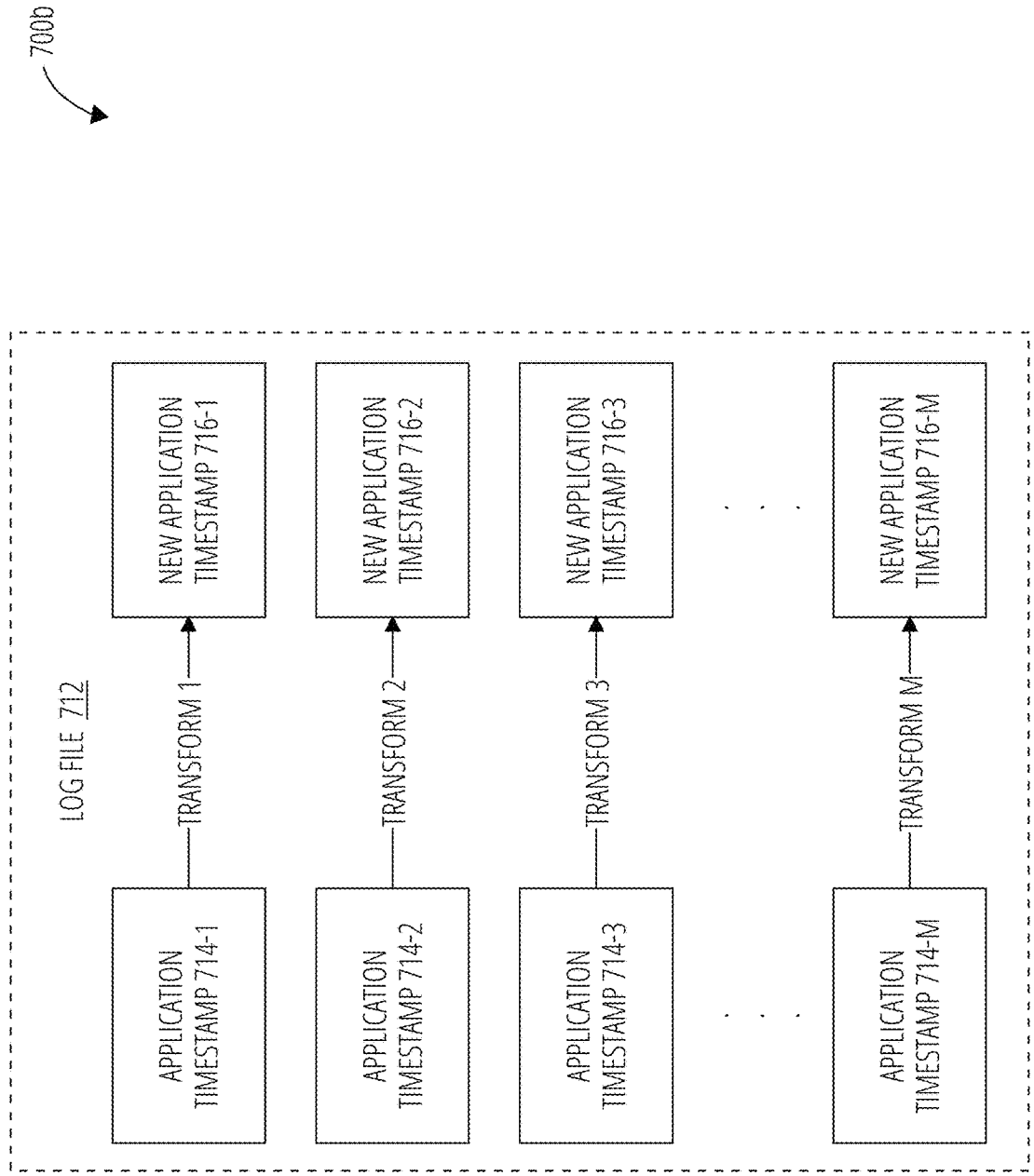
FIG. 7B illustrates an apparatus 700b.

FIG. 7B illustrates an apparatus 700*b* designed to operate as a transformer to transform a set of application timestamps 714-*m* to a set of new application timestamps 716-*m*, where m represents any positive integer. As shown in FIG. 7B, the log file 712 may include the application timestamps 714-1, 714-2, 714-3, . . . , 714-*m*. Once the device 402 takes over as clock leader for the device 702, the device 402 may send time messages 716 to the device 702. The device 702 may receive a time message 716. The clock manager 706 of the device 702 may synchronize the clock 708 of the device 702 with the clock 422 of the device 402, which has been updated with a recovered network time as previously described.

Once the clocks 422, 708 are synchronized, the clock manager 706 may determine that the application 710 needs to correct the set of application timestamps 714 previously stored using the network time from the clock 708 which was previously synchronized to the clock 306 of the device 302 (e.g., the original clock leader for the network that was compromised by the attacker 320). The clock manager 706 then enters a timestamp correction mode to correct the application timestamps 714.

During the timestamp correction mode, the clock manager 706 can recover past and potentially incorrect timestamps for the application 710 using the same or similar redundant timeline used to interpolate/extrapolate a corrected network timeline. In one embodiment, the clock manager 706 utilizes the regression model 416 and the application timestamps 718 to correct one or more application timestamps 714 for the application 710. The device 702 can receive the regression model 416 and timestamps 418, 420 from the device 402, to use this information to generate the redundant timeline 506. Alternatively, the device 702 can receive only the timestamps 418, 420, and use or build its own regression model similar to the regression model 416 to generate the redundant timeline 506. The clock manager 706 can reconstruct and/or correct the timestamps 714 to a corrected network time using a set of recovery information that includes, for example, the regression model 416, the application timestamps 714, 718, a valid (accurate) checkpoint prior to T1, and a valid (accurate) network time after T2.

The clock manager 706 uses the recovery information to transform at least some of the application timestamps 714-*m* to a set of new application timestamps 716-*m*. For instance, the clock manager 706 will perform transform 1 to transform application timestamp 714-1 to new application timestamp 716-1, transform 2 to transform application timestamp 714-2 to new application timestamp 716-2, and so forth. The new application timestamps 716-*m* will include a modified timestamp with a new network time generated with the redundant timeline 506. The transform technique used by the clock manager 706 will be described in more detail with reference to FIGS. 8-9.

Figure 8:
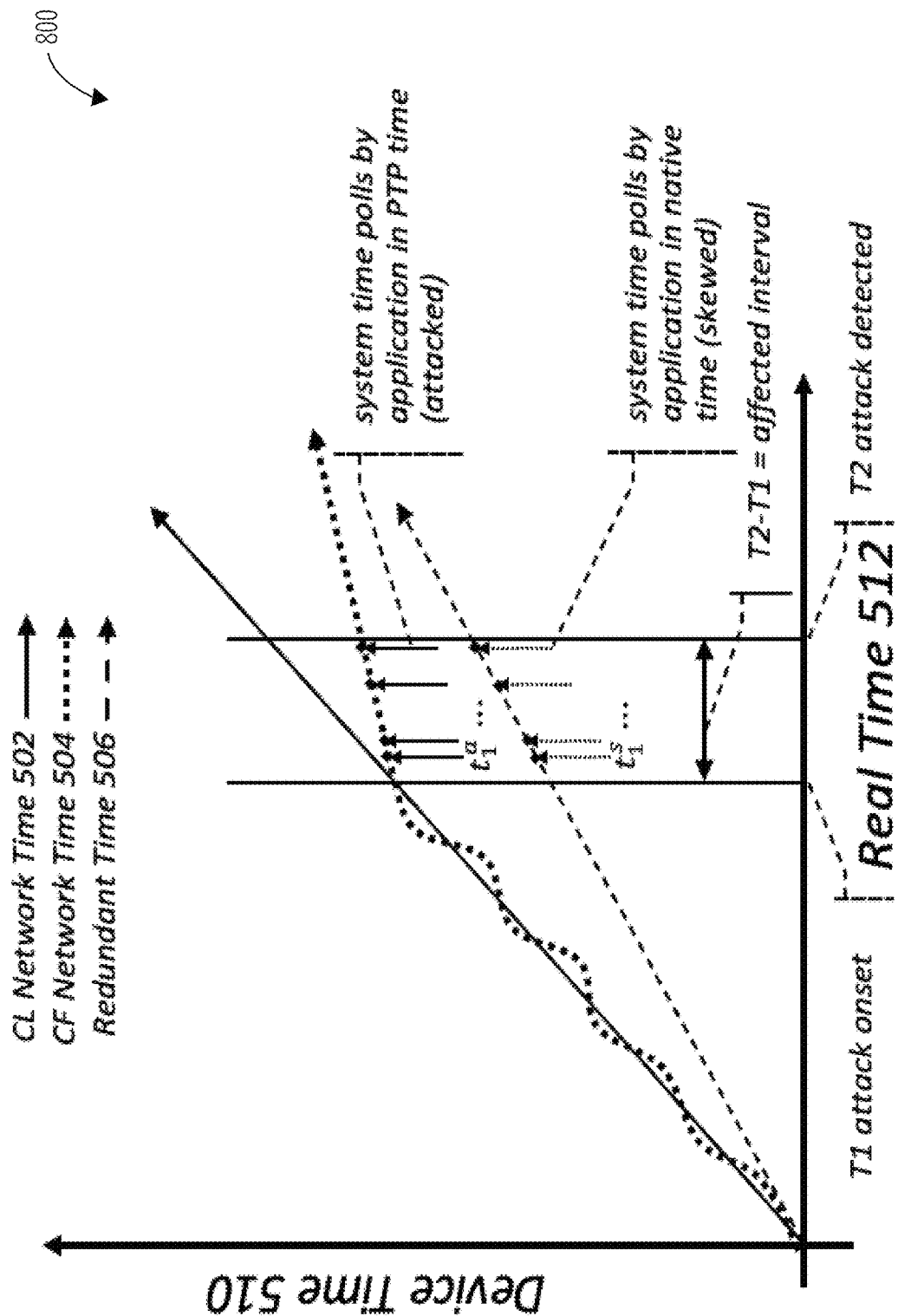
FIG. 8 illustrates a graph 800.

FIG. 8 illustrates a graph 800 similar to the graphs 500*a*, 500*b*, 600*b* and/or 600*d*. The graph 800 further illustrates a case where the application 170 polls the clock 708 at times t1–ta during the affected interval T2–T1, where a represents any positive number. The application 170 also polls the clock 720 for a set of times t1–ts that correspond to the times t1–ta, where s represents any positive number. When notified of the time attack on the clock leader of the TSN, the clock manager 706 assumes any timestamps 714 matching the times t1–ta are incorrect and therefore enters the timestamp correction mode to correct the affected timestamps 714.

Figure 9:
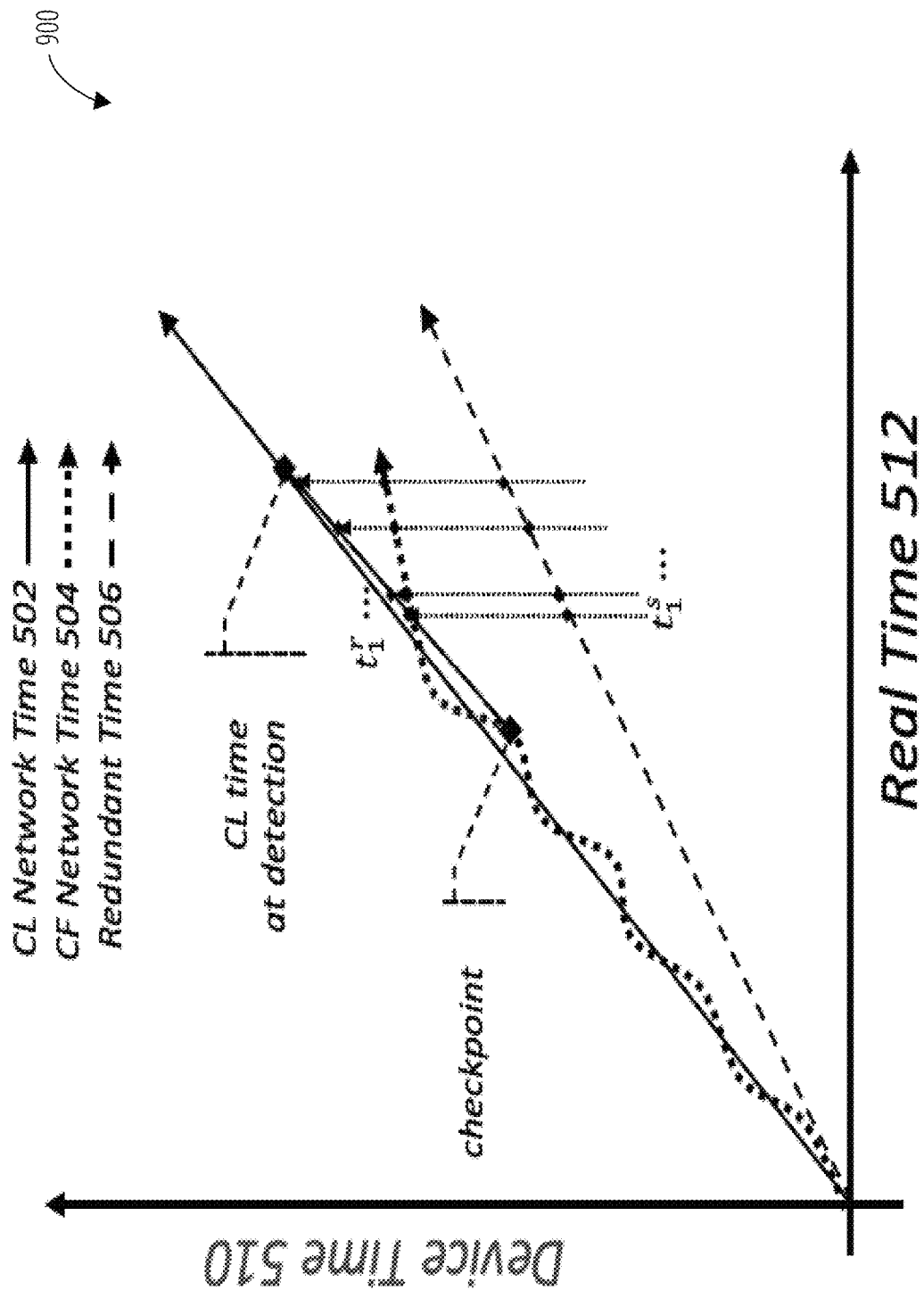
FIG. 9 illustrates a graph 900.

FIG. 9 illustrates a graph 900. The graph 900 is similar to the graph 800. The graph 900 illustrates the clock manager 706 correcting a network (PTP) time stored by the timestamps 714 at times t1–ta using the timestamps 718 at times t1–ts to calculate new network (PTP) times t1–tr, where r represents any positive number. The clock manager 706 calculates the new network (PTP) times t1–tr using a set of recovery information that includes, for example, the regression model 416, the application timestamps 714, 718, a valid (accurate) checkpoint prior to T1 (as denoted by the black diamond), and a valid (accurate) network time after T2 (as denoted by the black diamond). The valid checkpoint prior to T1 can be derived from the timestamps 714 recorded prior to T1 when the attack begins. A valid checkpoint prior to T1 can also be obtained by unrolling clock phase/frequency updates. For instance, every time correction could be subtracted from current time to account for phase updates (e.g., a PTP4L jump). In another example, every frequency update could be integrated over a synchronization period length to account for frequency adjustments (e.g., a PTP4L servo locked) and subtracted from a current time. The valid checkpoint after T2, for example a real time 512, can be derived from the regression model 416 and the timestamps 418, 420 as previously described.

Figure 10:
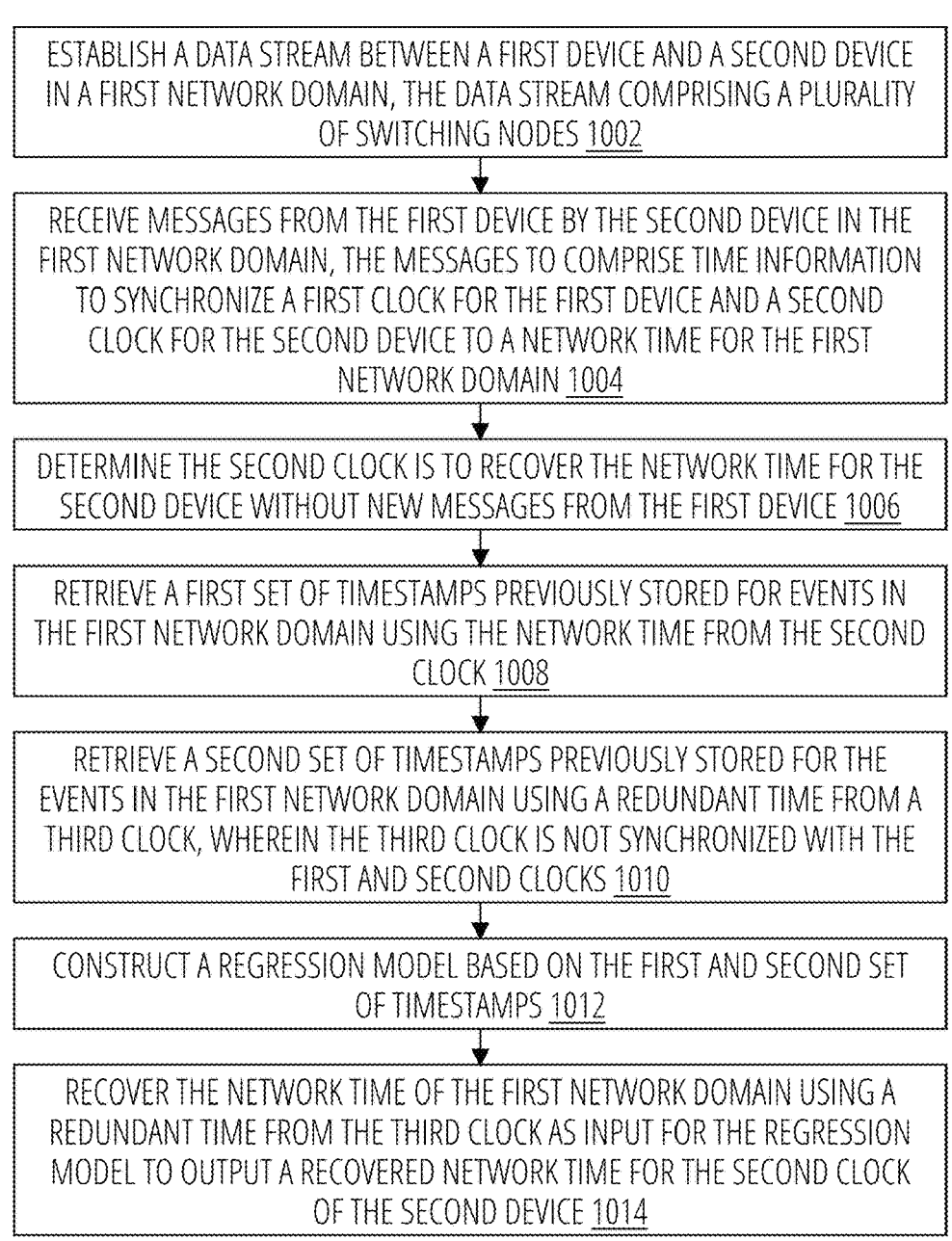
FIG. 10 illustrates a logic flow 1000.

FIG. 10 illustrates a logic flow 1000 that can be implemented to recover a network time for a TSN in response to timing attacks, in accordance with non-limiting example(s) of the present disclosure. Logic flow 1000 can be implemented by an apparatus providing TSN capabilities, such as system 400*a*, device 312 and/or device 402. Logic flow 1000 can be implemented by a system providing TSN capabilities, such as systems 300*a*, 300*b* and/or 400*b*. The system may comprise a part or subset of a larger network, such as the TSN networks 100*a*, 100*b*, 200*a* and/or 200*b*.

In block 1002, logic flow 1000 establishes a data stream between a first device and a second device in a first network domain, the data stream comprising a plurality of switching nodes. For instance, a data stream is established between a first device 434 and a second device 402 in a first network domain, the data stream comprising a plurality of switching nodes, such as switch nodes 104*a*-104*c*, for example.

In block 1004, logic flow 1000 receives messages from the first device by the second device in the first network domain, the messages to comprise time information to synchronize a first clock for the first device and a second clock for the second device to a network time for the first network domain. For instance, the second device 402 receives the message 436 from the first device 434 in the first network domain. The message 436 contains time information to synchronize a first clock 440 for the first device 434 and a second clock 422 for the second device 402 to a network time for the first network domain.

In block 1006, logic flow 1000 determines the second clock is to recover the network time for the second device without new messages from the first device. For instance, a clock manager 414 for the second device 402 may determine the second clock 422 is to recover the network time without new messages message 436 from the first device 434.

In block 1008, logic flow 1000 retrieves a first set of timestamps previously stored for events in the first network domain using the network time from the second clock. For instance, the clock manager 414 of the second device 402 may retrieve a first set of timestamps 418 previously stored for events in the first network domain using the network time from the second clock 422.

In block 1010, logic flow 1000 retrieves a second set of timestamps previously stored for the events in the first network domain using a redundant time from a third clock, wherein the third clock is not synchronized with the first and second clocks. For instance, the clock manager 414 of the second device 402 may retrieve a second set of timestamps 420 previously stored for the events in the first network domain using a redundant time from a third clock 424, wherein the third clock 424 is not synchronized with the first clock 440 and second clock 422.

In block 1012, logic flow 1000 constructs a regression model based on the first and second set of timestamps. For instance, the clock manager 414 may construct or retrieve a regression model 416 based on the first and second set of timestamps 418, 420.

In block 1014, logic flow 1000 recovers the network time of the first network domain using a redundant time from the third clock as input for the regression model to output a recovered network time for the second clock of the second device. The clock manager 414 may recover the network time of the first network domain using a redundant time from the third clock 424 as input for the regression model 416 to output a recovered network time for the second clock 422 of the second device 402.

Figure 11:
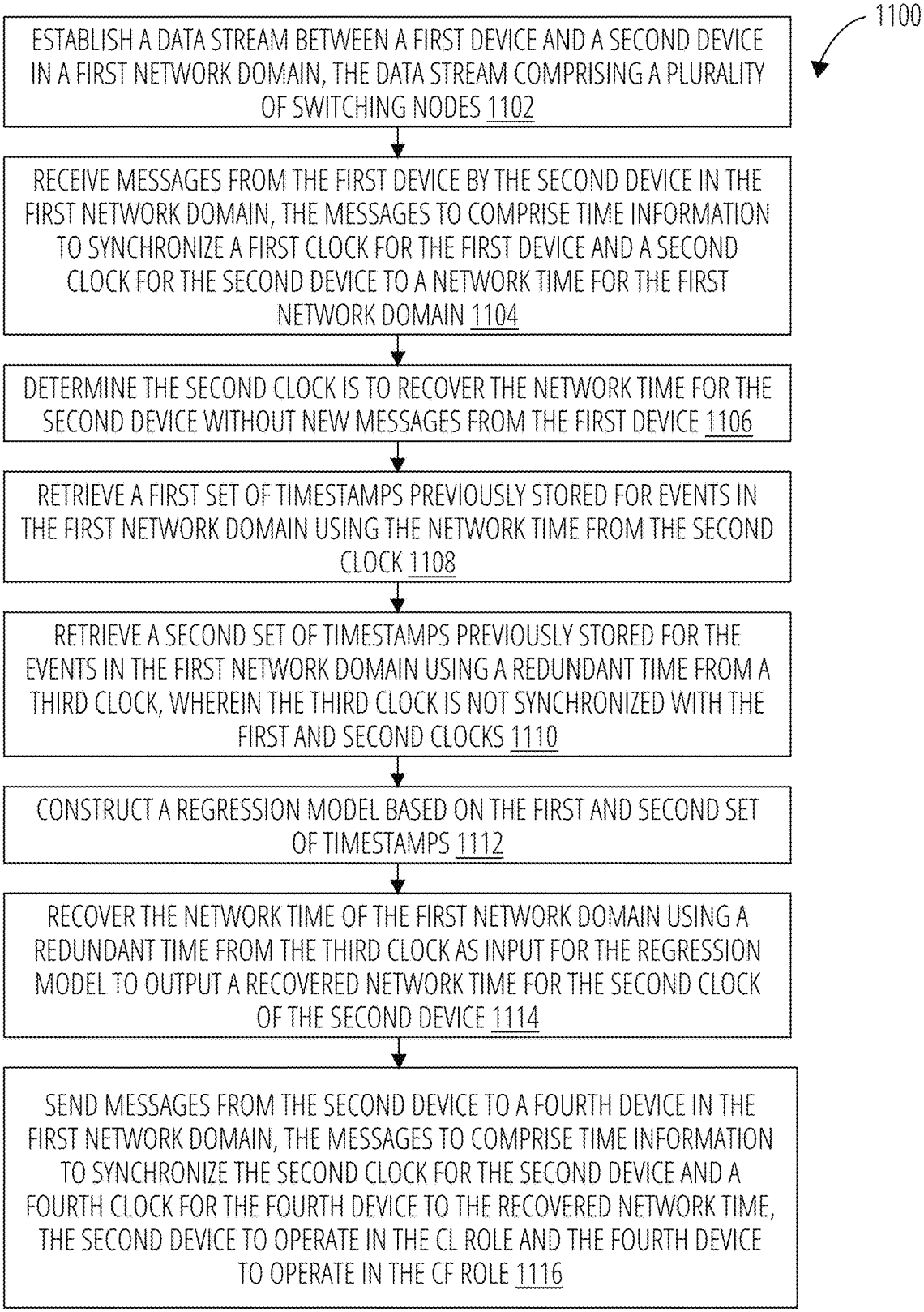
FIG. 11 illustrates a logic flow 1100.

FIG. 11 illustrates a logic flow 1100 that can be implemented to recover a network time for a TSN in response to timing attacks and switch operation from a clock follower to a clock leader for another device in the TSN, in accordance with non-limiting example(s) of the present disclosure. Logic flow 1100 can be implemented by an apparatus providing TSN capabilities, such as system 400a, device 312 and/or device 402. Logic flow 1100 can be implemented by a system providing TSN capabilities, such as systems 300a, 300b and/or 400b. The system may comprise a part or subset of a larger network, such as the TSN networks 100a, 100b, 200a and/or 200b.

In block 1102, logic flow 1100 establishes a data stream between a first device and a second device in a first network domain, the data stream comprising a plurality of switching nodes. In block 1104, logic flow 1100 receives messages from the first device by the second device in the first network domain, the messages to comprise time information to synchronize a first clock for the first device and a second clock for the second device to a network time for the first network domain. In block 1106, logic flow 1100 determines the second clock is to recover the network time for the second device without new messages from the first device. In block 1108, logic flow 1100 retrieves a first set of timestamps previously stored for events in the first network domain using the network time from the second clock. In block 1110, logic flow 1100 retrieves a second set of timestamps previously stored for the events in the first network domain using a redundant time from a third clock, wherein the third clock is not synchronized with the first and second clocks. In block 1112, logic flow 1100 constructs a regression model based on the first and second set of timestamps. In block 1114, logic flow 1100 recovers the network time of the first network domain using a redundant time from the third clock as input for the regression model to output a recovered network time for the second clock of the second device. Examples for blocks 1102-1114 of the logic flow 1100 may be similar to those given for block 1002-1014 of the logic flow 1000.

In block 1116, logic flow 1100 sends messages from the second device to a fourth device in the first network domain, the messages to comprise time information to synchronize the second clock for the second device and a fourth clock for the fourth device to the recovered network time, the second device to operate in the CL role and the fourth device to operate in the CF role. For instance, the clock manager 414 of the second device 402 may send a message 716 to a fourth device 702 in the first network domain. The message 716 may carry time information to synchronize the second clock 422 for the second device 402 and a fourth clock 708 for the fourth device 702 to the recovered network time. In this configuration, the second device 402 switches from the CF role to the CL role, and the fourth device 702 operates in the CF role following the new CL device 402.

Figure 12:
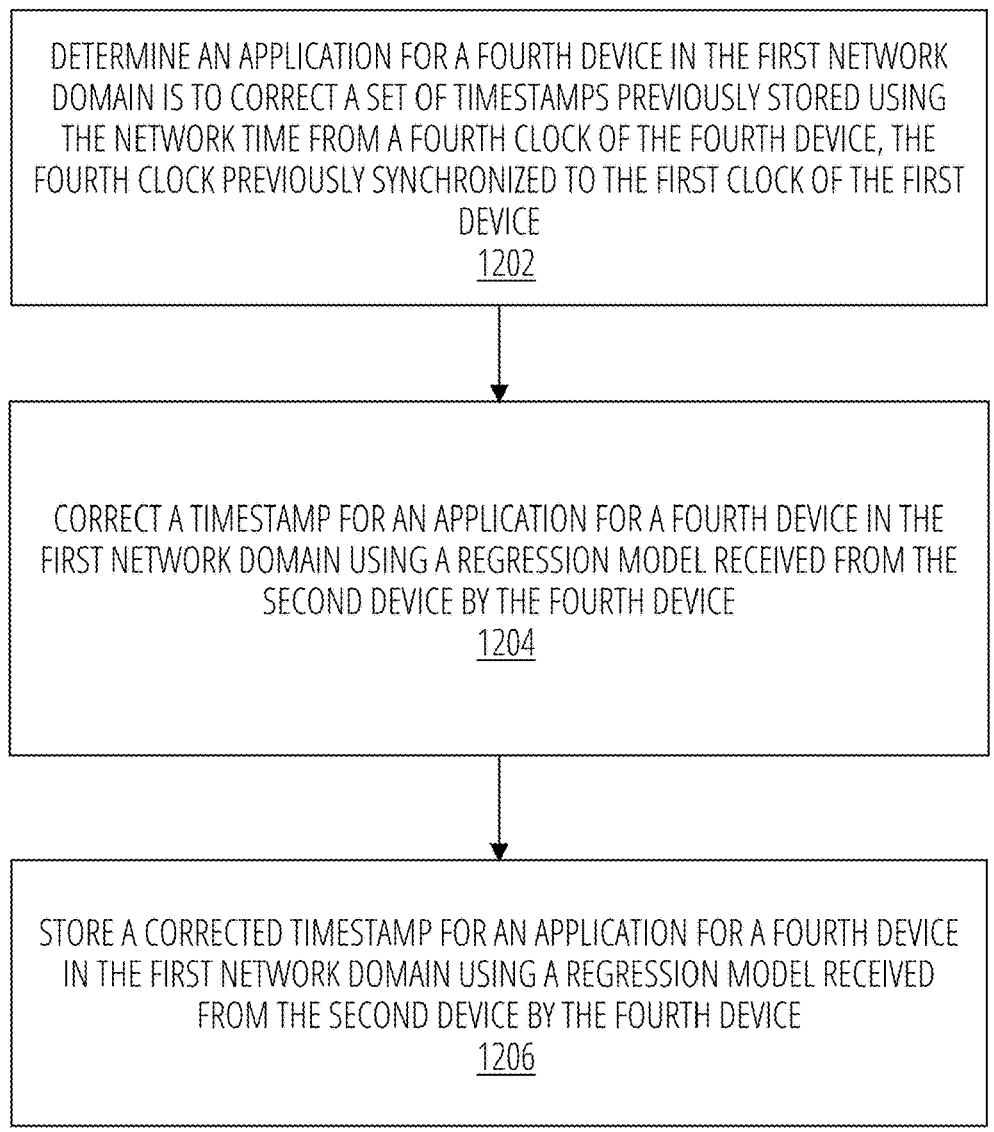
FIG. 12 illustrates a logic flow 1200.

FIG. 12 illustrates a logic flow 1200 that can be implemented to correct timestamps for an application operating in a TSN, in accordance with non-limiting example(s) of the present disclosure. Logic flow 1200 can be implemented by an apparatus providing TSN capabilities, such as device 312, device 402, device 702 and/or apparatus 700b. Logic flow 1200 can be implemented by a system providing TSN capabilities, such as systems 300a, 300b, 400b and/or 700a. The system may comprise a part or subset of a larger network, such as the TSN networks 100a, 100b, 200a and/or 200b.

In block 1202, the logic flow 1200 determines an application for a fourth device in the first network domain is to correct a set of timestamps previously stored using the network time from a fourth clock of the fourth device, the fourth clock previously synchronized to the first clock of the first device. For instance, the clock manager 706 for the fourth device 702 in the first network domain determines an application 710 is to correct a set of timestamps 714 previously stored using the network time from a fourth clock 708 of the fourth device 702. The fourth clock 708 was previously synchronized to the first clock 440 of the first device 434.

In block 1204, the logic flow 1200 corrects a timestamp for an application for a fourth device in the first network domain using a regression model received from the second device by the fourth device. For instance, the clock manager 706 for the fourth device 702 may correct a timestamp 714 for an application 710 using a regression model 416 received from the second device 402 by the fourth device 702. Alternatively, the fourth device 702 may already store the regression model 416.

In block 1206, the logic flow 1200 stores a corrected timestamp for an application for a fourth device in the first network domain using a regression model received from the second device by the fourth device. For instance, the clock manager 706 for the fourth device 702 may store a corrected timestamp 716 for the application 710 using the regression model 416 received from the second device 402 by the fourth device 702.

Figures 13A, 13B:
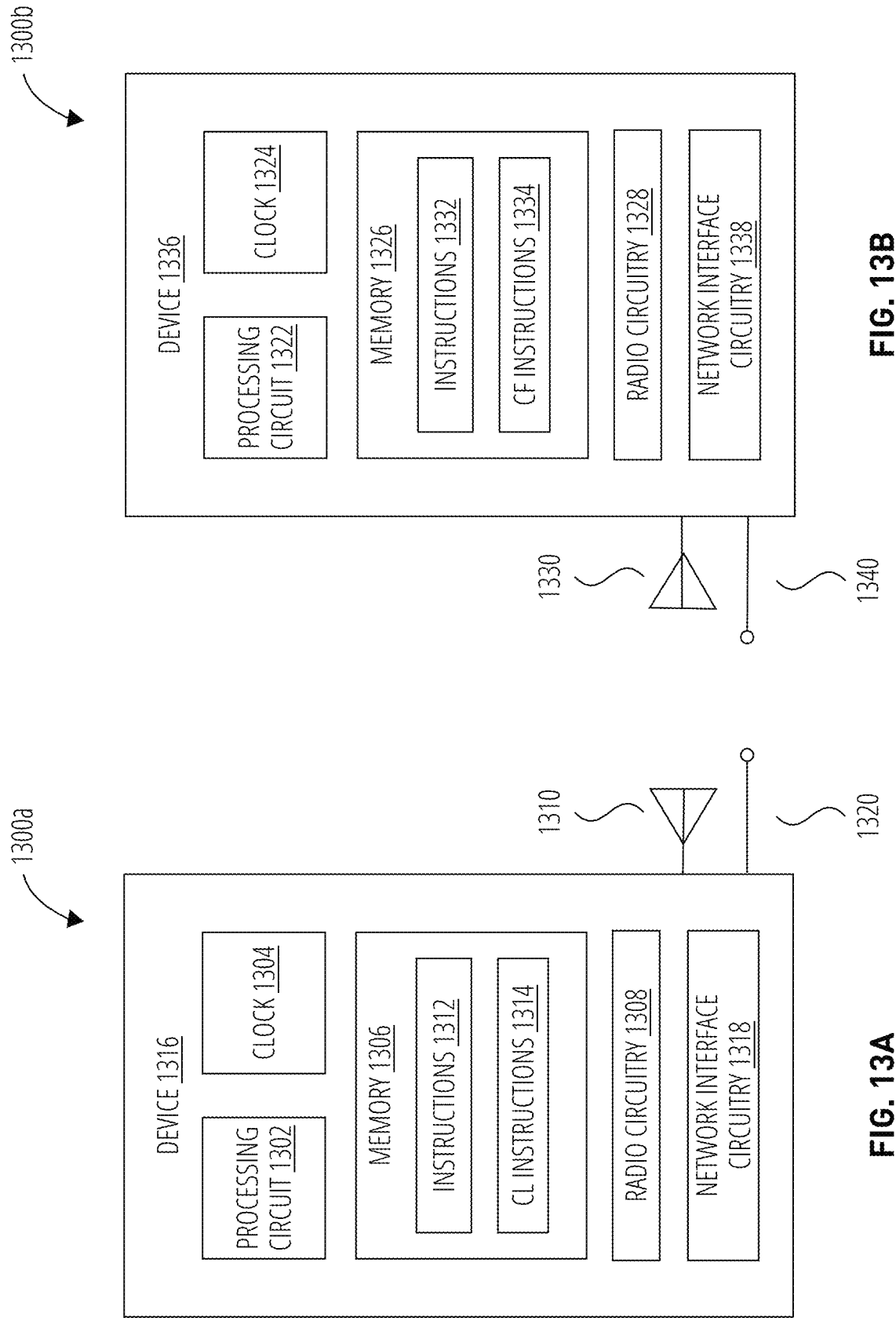

FIG. 13A depicts a device 1316. The device 1316 could be a network node or one of the switches in a TSN network (e.g., devices 102, 104A-C, 302, 402, 434, etc.). Device 1316 includes a processing circuit 1302, a clock 1304, memory 1306, radio circuitry 1308, an antenna 1310, a network interface circuitry 1318, and a wired connection 1320. Memory 1306 stores instructions 1312 and CL instructions 1314. During operation, processing circuit 1302 can execute instructions 1312 and/or CL instructions 1314 to cause device 1316 to send timing messages as a clock leader or grand clock leader (e.g., from time measurements from a global clock for a TSN network) to other devices in the TSN network. In some examples, processing circuit 1302 can execute instructions 1312 and/or CL instructions 1314 to cause device 1316 to send time synchronization messages, time update messages, and other timing messages defined by various IEEE standards as discussed herein. Furthermore, processing circuit 1302 can execute instructions 1312 to cause device 1316 to send, via radio circuitry 1308 and antenna 1310 or network interface circuitry 1318 timing messages as the CL for a CF in a TSN network.

FIG. 13B depicts a device 1336. The device 1336 could be one of the network nodes or switches in a TSN network (e.g., devices 102, 104A-C, 106, 312, 402, 428, 702, etc.).

Device 1336 includes a processing circuit 1322, a clock 1324, memory 1326, radio circuitry 1328, an antenna 1330, a network interface circuitry 1338, and a wired connection 1340. Memory 1326 stores instructions 1332 and CF instructions 1334. During operation, processing circuit 1322 can execute instructions 1332 and/or CF instructions 1334 to cause device 1336 to receive timing messages as a clock follower (e.g., from time measurements from a global clock for a TSN network) from other devices in the TSN network, such as the device 1316. In some examples, processing circuit 1322 can execute instructions 1332 and/or CF instructions 1334 to cause device 1336 to receive time synchronization messages, time update messages, and other timing messages defined by various IEEE standards as discussed herein. Furthermore, processing circuit 1322 can execute instructions 1332 and/or CF instructions 1334 to cause device 1336 to receive, via radio circuitry 1328 and antenna 1330 or network interface circuitry 1338 timing messages as the CF for a CL in a TSN network. In addition, processing circuit 1322 can execute instructions 1332 and/or CF instructions 1334 to cause device 1336 to send, via radio circuitry 1328 and antenna 1330 or network interface circuitry 1338 security messages in response to a security attack, such as alert messages, notification messages, network reconfiguration messages, device isolation messages, model update messages, and other messages in a TSN network.

Figure 14:
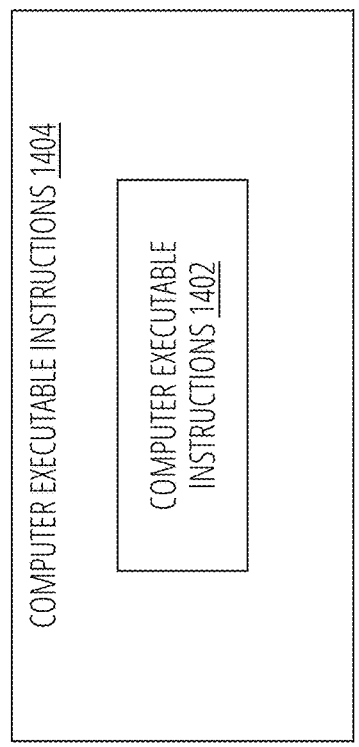
FIG. 14 illustrates a computer-readable storage medium 1400.

FIG. 14 illustrates computer-readable storage medium 140. Computer-readable storage medium 1400 may comprise any non-transitory computer-readable storage medium or machine-readable storage medium, such as an optical, magnetic or semiconductor storage medium. In various embodiments, computer-readable storage medium 1400 may comprise an article of manufacture. In some embodiments, computer-readable storage medium 1400 may store computer executable instructions 1402 with which circuitry (e.g., processing circuitry 404, processing circuit 1302, processing circuit 1322, radio circuitry 1308, radio circuitry 1328, network interface circuitry 1318, network interface circuitry 1338, clock manager 304, clock manager 314, clock manager 414, clock manager 430, clock manager 438, clock manager 706, or the like) can execute. For example, computer executable instructions 1402 can include instructions to implement operations described with respect to logic flows 1000, 1100 and 1200. Examples of computer-readable storage medium 1400 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 1402 may include any suitable type of code, such as source code, compiled code, interpreted code, executable code, static code, dynamic code, object-oriented code, visual code, and the like.

The following examples pertain to further embodiments, from which numerous permutations and configurations will be apparent.

Example 1. An apparatus, comprising: a processing circuitry; a memory coupled to the processing circuitry, the memory to store instructions that when executed by the processing circuitry causes the processing circuitry to: establish a data stream between a first device and a second device in a first network domain, the data stream comprising a plurality of switching nodes; receive messages from the first device by the second device in the first network domain, the messages to comprise time information to synchronize a first clock for the first device and a second clock for the second device to a network time for the first network domain; determine the second clock is to recover the network time for the second device without new messages from the first device; retrieve a first set of timestamps previously stored for events in the first network domain using the network time from the second clock; retrieve a second set of timestamps previously stored for the events in the first network domain using a redundant time from a third clock, wherein the third clock is not synchronized with the first and second clocks; construct a regression model based on the first and second set of timestamps; and recover the network time of the first network domain using a redundant time from the third clock as input for the regression model to output a recovered network time for the second clock of the second device.

Example 2. The apparatus of Example 1, the processing circuitry to establish the data stream in accordance with the Institute of Electrical and Electronics Engineers (IEEE) 802.1AS and/or 802.1Qbv and/or 1588 standards.

Example 3. The apparatus of Example 1, wherein the network time is a precision time protocol (PTP) time.

Example 4. The apparatus of Example 1, wherein the messages are synchronization messages or follow up messages for a precision time protocol (PTP).

Example 5. The apparatus of Example 1, wherein the first device operates in a clock leader (CL) role and the second device operates in a clock follower (CF) role.

Example 6. The apparatus of Example 1, the processing circuitry to determine the second clock is to recover the network time for the second device without new messages from the first device when the messages are not received by the second device for a defined time interval.

Example 7. The apparatus of Example 1, the processing circuitry to determine the second clock is to recover the network time for the second device without new messages from the first device in response to a message indicating the first device is under a security attack and placed in isolation from the first network domain.

Example 8. The apparatus of Example 1, the processing circuitry to store the first set of timestamps for events in the first network domain based on the network time from the second clock by the second device.

Example 9. The apparatus of Example 1, wherein the third clock is a monotonic counter.

Example 10. The apparatus of Example 1, wherein the redundant time from the third clock maintains a defined relationship with the network time from the second clock.

Example 11. The apparatus of Example 1, wherein the redundant time from the third clock maintains a defined relationship with the network time from the second clock, the defined relationship to comprise an approximate linear relationship.

Example 12. The apparatus of Example 1, wherein the third clock is implemented by the second device in the first network domain or a second network domain.

Example 13. The apparatus of Example 1, the processing circuitry to store the second set of timestamps for the events in the first network domain based on the redundant time from the third clock of the second device.

Example 14. The apparatus of Example 1, wherein the third clock is implemented by a third device in a second network domain separate from the first network domain.

Example 15. The apparatus of Example 1, the processing circuitry to send the events in the first network domain based on network time from the second clock of the second device to a third device in a second network domain separate from the first network domain.

Example 16. The apparatus of Example 1, the processing circuitry to store the second set of timestamps for the events in the first network domain based on the redundant time from the third clock by a third device in a second network domain separate from the first network domain.

Example 17. The apparatus of Example 1, the processing circuitry to receive the second set of timestamps for the events in the first network domain based on the redundant time from the third clock of a third device in a second network domain separate from the first network domain, the second set of timestamps received by the second device from the third device.

Example 18. The apparatus of Example 1, the processing circuitry to recover the network time of the first network domain using the redundant time from the third clock as input for the regression model to output the recovered network time for the second clock of the second device, the processing circuitry to: receive a current redundant time from the third clock in the second network domain not synchronized with the first and second clocks; calculate a recovered network time with the regression model; synchronize the second clock of the second device to the recovered network time.

Example 19. The apparatus of Example 1, the processing circuitry to determine to switch the second device from operating in the CF role to operating in the CL role for the first network domain.

Example 20. The apparatus of Example 1, the processing circuitry to switch the second device from operating in the CF role to operating in the CL role for the first network domain.

Example 21. The apparatus of Example 1, the processing circuitry to send messages from the second device to a fourth device in the first network domain, the messages to comprise time information to synchronize the second clock for the second device and a fourth clock for the fourth device to the recovered network time, the second device to operate in the CL role and the fourth device to operate in the CF role.

Example 22. The apparatus of Example 21, the processing circuitry to: establish a data stream between the second device and the fourth device in a first network domain, the data stream comprising a plurality of switching nodes; and receive messages from the second device by the fourth device in the first network domain, the messages to comprise time information to synchronize the second clock for the second device and the fourth clock for the fourth device to the recovered network time.

Example 23. The apparatus of Example 21, the processing circuitry to determine an application for a fourth device in the first network domain is to correct a set of timestamps previously stored using the network time from a fourth clock of the fourth device, the fourth clock previously synchronized to the first clock of the first device.

Example 24. The apparatus of Example 21, the processing circuitry to receive a regression model from the second device by the fourth device in the first network domain.

Example 25. The apparatus of Example 21, the processing circuitry to: receive the first and second set of timestamps by the fourth device in the first network domain; and construct a regression model based on the first and second set of timestamps by the fourth device.

Example 26. The apparatus of Example 21, the processing circuitry to correct a timestamp for an application for a fourth device in the first network domain using a regression model received from the second device by the fourth device.

Example 27. The apparatus of Example 21, the processing circuitry to store a corrected timestamp for an application for a fourth device in the first network domain using a regression model received from the second device by the fourth device.

Example 28. The apparatus of Example 21, the processing circuitry to determine a checkpoint for the fourth device based on a message from an intrusion detection system (IDS).

Example 29. The apparatus of Example 21, the processing circuitry to roll back the recovered network time by a cumulative amount of frequency and phase corrections of the network time for the fourth clock of the fourth device.

Example 30. A computing-implemented method, comprising: establishing a data stream between a first device and a second device in a first network domain, the data stream comprising a plurality of switching nodes; receiving messages from the first device by the second device in the first network domain, the messages to comprise time information to synchronize a first clock for the first device and a second clock for the second device to a network time for the first network domain; determining the second clock is to recover the network time for the second device without new messages from the first device; retrieving a first set of timestamps previously stored for events in the first network domain using the network time from the second clock; retrieving a second set of timestamps previously stored for the events in the first network domain using a redundant time from a third clock, wherein the third clock is not synchronized with the first and second clocks; constructing a regression model based on the first and second set of timestamps; and recovering the network time of the first network domain using a redundant time from the third clock as input for the regression model to output a recovered network time for the second clock of the second device.

Example 31. The computing-implemented method of Example 30, comprising establishing the data stream in accordance with the Institute of Electrical and Electronics Engineers (IEEE) 802.1AS and/or 802.1Qbv and/or 1588 standards.

Example 32. The computing-implemented method of Example 30, wherein the network time is a precision time protocol (PTP) time.

Example 33. The computing-implemented method of Example 30, wherein the messages are synchronization messages or follow up messages for a precision time protocol (PTP).

Example 34. The computing-implemented method of Example 30, wherein the first device operates in a clock leader (CL) role and the second device operates in a clock follower (CF) role.

Example 35. The computing-implemented method of Example 30, determining the second clock is to recover the network time for the second device without new messages from the first device when the messages are not received by the second device for a defined time interval.

Example 36. The computing-implemented method of Example 30, determining the second clock is to recover the network time for the second device without new messages from the first device in response to a message indicating the first device is under a security attack and placed in isolation from the first network domain.

Example 37. The computing-implemented method of Example 30, comprising storing the first set of timestamps for events in the first network domain based on the network time from the second clock by the second device.

Example 38. The computing-implemented method of Example 30, wherein the third clock is a monotonic counter.

Example 39. The computing-implemented method Example 30, wherein the redundant time from the third clock maintains a defined relationship with the network time from the second clock.

Example 40. The computing-implemented method of Example 30, wherein the redundant time from the third clock maintains a defined relationship with the network time from the second clock, the defined relationship to comprise an approximate linear relationship.

Example 41. The computing-implemented method of Example 30, wherein the third clock is implemented by the second device in the first network domain or a second network domain.

Example 42. The computing-implemented method of Example 30, comprising storing the second set of timestamps for the events in the first network domain based on the redundant time from the third clock of the second device.

Example 43. The computing-implemented method Example 30, wherein the third clock is implemented by a third device in a second network domain separate from the first network domain.

Example 44. The computing-implemented method of Example 30, comprising sending the events in the first network domain based on network time from the second clock of the second device to a third device in a second network domain separate from the first network domain.

Example 45. The computing-implemented method of Example 30, comprising storing the second set of timestamps for the events in the first network domain based on the redundant time from the third clock by a third device in a second network domain separate from the first network domain.

Example 46. The computing-implemented method of Example 30, comprising receiving the second set of timestamps for the events in the first network domain based on the redundant time from the third clock of a third device in a second network domain separate from the first network domain, the second set of timestamps received by the second device from the third device.

Example 47. The computing-implemented method of Example 30, comprising recovering the network time of the first network domain using the redundant time from the third clock as input for the regression model to output the recovered network time for the second clock of the second device by: receiving a current redundant time from the third clock in the second network domain not synchronized with the first and second clocks; calculating a recovered network time with the regression model; synchronizing the second clock of the second device to the recovered network time.

Example 48. The computing-implemented method of Example 30, comprising determining to switch the second device from operating in the CF role to operating in the CL role for the first network domain.

Example 49. The computing-implemented method of Example 30, comprising switching the second device from operating in the CF role to operating in the CL role for the first network domain.

Example 50. The computing-implemented method of Example 30, comprising sending messages from the second device to a fourth device in the first network domain, the messages to comprise time information to synchronize the second clock for the second device and a fourth clock for the fourth device to the recovered network time, the second device to operate in the CL role and the fourth device to operate in the CF role.

Example 51. The computing-implemented method of Example 50, comprising: establishing a data stream between the second device and the fourth device in a first network domain, the data stream comprising a plurality of switching nodes; and receiving messages from the second device by the fourth device in the first network domain, the messages to comprise time information to synchronize the second clock for the second device and the fourth clock for the fourth device to the recovered network time.

Example 52. The computing-implemented method of Example 30, comprising determining an application for a fourth device in the first network domain is to correct a set of timestamps previously stored using the network time from a fourth clock of the fourth device, the fourth clock previously synchronized to the first clock of the first device.

Example 53. The computing-implemented method of Example 30, comprising receiving a regression model from the second device by the fourth device in the first network domain.

Example 54. The computing-implemented method of Example 30, comprising:
receiving the first and second set of timestamps by the fourth device in the first network domain; and
constructing a regression model based on the first and second set of timestamps by the fourth device.

Example 55. The computing-implemented method of Example 30, comprising correcting a timestamp for an application for a fourth device in the first network domain using a regression model received from the second device by the fourth device.

Example 56. The computing-implemented method of Example 30, comprising storing a corrected timestamp for an application for a fourth device in the first network domain using a regression model received from the second device by the fourth device.

Example 57. The computing-implemented method of Example 30, comprising determining a checkpoint for the fourth device based on a message from an intrusion detection system (IDS)

Example 58. The computing-implemented method of Example 30, comprising rolling back the recovered network time by a cumulative amount of frequency and phase corrections of the network time for the fourth clock of the fourth device.

Example 59. A non-transitory computer-readable storage device, storing instructions that when executed by processing circuitry of a manager of a time sensitive network (TSN), cause the manager to: receive messages from the first device by the second device in the first network domain, the messages to comprise time information to synchronize a first clock for the first device and a second clock for the second device to a network time for the first network domain; determine the second clock is to recover the network time for the second device without new messages from the first device; retrieve a first set of timestamps previously stored for events in the first network domain using the network time from the second clock; retrieve a second set of timestamps previously stored for the events in the first network domain using a redundant time from a third clock, wherein the third clock is not synchronized with the first and second clocks; construct a regression model based on the first and second set of timestamps; and recover the network time of the first network domain using a redundant time from the third clock as input for the regression model to output a recovered network time for the second clock of the second device.

Example 60. The computer-readable storage medium of Example 59, the instructions, when executed by the processing circuitry, cause the manager to establish the data stream in accordance with the Institute of Electrical and Electronics Engineers (IEEE) 802.1AS and/or 802.1Qbv and/or 1588 standards.

Example 61. The computer-readable storage medium of Example 59, wherein the network time is a precision time protocol (PTP) time.

Example 62. The computer-readable storage medium of Example 59, wherein the messages are synchronization messages or follow up messages for a precision time protocol (PTP).

Example 63. The computer-readable storage medium of Example 59, wherein the first device operates in a clock leader (CL) role and the second device operates in a clock follower (CF) role.

Example 64. The computer-readable storage medium of Example 59, the instructions, when executed by the processing circuitry, cause the manager to determine the second clock is to recover the network time for the second device without new messages from the first device when the messages are not received by the second device for a defined time interval.

Example 65. The computer-readable storage medium of Example 59, the instructions, when executed by the processing circuitry, cause the manager to determine the second clock is to recover the network time for the second device without new messages from the first device in response to a message indicating the first device is under a security attack and placed in isolation from the first network domain.

Example 66. The computer-readable storage medium of Example 59, the instructions, when executed by the processing circuitry, cause the manager to store the first set of timestamps for events in the first network domain based on the network time from the second clock by the second device.

Example 67. The computer-readable storage medium of Example 59, wherein the third clock is a monotonic counter.

Example 68. The computer-readable storage medium of Example 59, wherein the redundant time from the third clock maintains a defined relationship with the network time from the second clock.

Example 69. The computer-readable storage medium of Example 59, wherein the redundant time from the third clock maintains a defined relationship with the network time from the second clock, the defined relationship to comprise an approximate linear relationship.

Example 70. The computer-readable storage medium of claim Example 59, wherein the third clock is implemented by the second device in the first network domain or a second network domain.

Example 71. The computer-readable storage medium of Example 59, the instructions, when executed by the processing circuitry, cause the manager to store the second set of timestamps for the events in the first network domain based on the redundant time from the third clock of the second device.

Example 72. The computer-readable storage medium of Example 59, wherein the third clock is implemented by a third device in a second network domain separate from the first network domain.

Example 73. The computer-readable storage medium of Example 59, the instructions, when executed by the processing circuitry, cause the manager to send the events in the first network domain based on network time from the second clock of the second device to a third device in a second network domain separate from the first network domain.

Example 74. The computer-readable storage medium of Example 59, the instructions, when executed by the processing circuitry, cause the manager to store the second set of timestamps for the events in the first network domain based on the redundant time from the third clock by a third device in a second network domain separate from the first network domain.

Example 75. The computer-readable storage medium of Example 59, the instructions, when executed by the processing circuitry, cause the manager to receive the second set of timestamps for the events in the first network domain based on the redundant time from the third clock of a third device in a second network domain separate from the first network domain, the second set of timestamps received by the second device from the third device.

Example 76. The computer-readable storage medium of Example 59, the instructions, when executed by the processing circuitry, cause the manager to recover the network time of the first network domain using the redundant time from the third clock as input for the regression model to output the recovered network time for the second clock of the second device, the manager to: receive a current redundant time from the third clock in the second network domain not synchronized with the first and second clocks; calculate a recovered network time with the regression model; synchronize the second clock of the second device to the recovered network time.

Example 77. The computer-readable storage medium of Example 59, the instructions, when executed by the processing circuitry, cause the manager to determine to switch the second device from operating in the CF role to operating in the CL role for the first network domain.

Example 78. The computer-readable storage medium of Example 59, the instructions, when executed by the processing circuitry, cause the manager to switch the second device from operating in the CF role to operating in the CL role for the first network domain.

Example 79. The computer-readable storage medium of Example 59, the instructions, when executed by the processing circuitry, cause the manager to send messages from the second device to a fourth device in the first network domain, the messages to comprise time information to synchronize the second clock for the second device and a fourth clock for the fourth device to the recovered network time, the second device to operate in the CL role and the fourth device to operate in the CF role.

Example 80. The computer-readable storage medium of Example 79, the instructions, when executed by the processing circuitry, cause the manager to: establish a data stream between the second device and the fourth device in a first network domain, the data stream comprising a plurality of switching nodes; and receive messages from the second device by the fourth device in the first network domain, the messages to comprise time information to synchronize the second clock for the second device and the fourth clock for the fourth device to the recovered network time.

Example 81. The computer-readable storage medium of Example 79, the instructions, when executed by the processing circuitry, cause the manager to determine an application for a fourth device in the first network domain is to correct a set of timestamps previously stored using the network time from a fourth clock of the fourth device, the fourth clock previously synchronized to the first clock of the first device.

Example 82. The computer-readable storage medium of Example 79, the instructions, when executed by the processing circuitry, cause the manager to receive a regression model from the second device by the fourth device in the first network domain.

Example 83. The computer-readable storage medium of Example 79, the instructions, when executed by the processing circuitry, cause the manager to: receive the first and second set of timestamps by the fourth device in the first network domain; and construct a regression model based on the first and second set of timestamps by the fourth device.

Example 84. The computer-readable storage medium of Example 79, the instructions, when executed by the processing circuitry, cause the manager to correct a timestamp for an application for a fourth device in the first network domain using a regression model received from the second device by the fourth device.

Example 85. The computer-readable storage medium of Example 79, the instructions, when executed by the processing circuitry, cause the manager to store a corrected timestamp for an application for a fourth device in the first network domain using a regression model received from the second device by the fourth device.

Example 86. The computer-readable storage medium of Example 79, the instructions, when executed by the processing circuitry, cause the manager to determine a checkpoint for the fourth device based on a message from an intrusion detection system (IDS).

Example 87. The computer-readable storage medium of Example 79, the instructions, when executed by the processing circuitry, cause the manager to roll back the recovered network time by a cumulative amount of frequency and phase corrections of the network time for the fourth clock of the fourth device.

Example 88. An apparatus, comprising: means for establishing a data stream between a first device and a second device in a first network domain, the data stream comprising a plurality of switching nodes; means for receiving messages from the first device by the second device in the first network domain, the messages to comprise time information to synchronize a first clock for the first device and a second clock for the second device to a network time for the first network domain; means for determining the second clock is to recover the network time for the second device without new messages from the first device; means for retrieving a first set of timestamps previously stored for events in the first network domain using the network time from the second clock; means for retrieving a second set of timestamps previously stored for the events in the first network domain using a redundant time from a third clock, wherein the third clock is not synchronized with the first and second clocks; means for constructing a regression model based on the first and second set of timestamps; and means for recovering the network time of the first network domain using a redundant time from the third clock as input for the regression model to output a recovered network time for the second clock of the second device.

Example 89. The apparatus of Example 88, comprising means for establishing the data stream in accordance with the Institute of Electrical and Electronics Engineers (IEEE) 802.1AS and/or 802.1Qbv and/or 1588 standards.

Example 90. The apparatus of Example 88, wherein the network time is a precision time protocol (PTP) time.

Example 91. The apparatus of Example 88, wherein the messages are synchronization messages or follow up messages for a precision time protocol (PTP).

Example 92. The apparatus of Example 88, wherein the first device operates in a clock leader (CL) role and the second device operates in a clock follower (CF) role.

Example 93. The apparatus of Example 88, comprising means for determining the second clock is to recover the network time for the second device without new messages from the first device when the messages are not received by the second device for a defined time interval.

Example 94. The apparatus of Example 88, comprising means for determining the second clock is to recover the network time for the second device without new messages from the first device in response to a message indicating the first device is under a security attack and placed in isolation from the first network domain.

Example 95. The apparatus of Example 88, comprising means for storing the first set of timestamps for events in the first network domain based on the network time from the second clock by the second device.

Example 96. The apparatus of Example 88, wherein the third clock is a monotonic counter.

Example 97. The apparatus of Example 88, wherein the redundant time from the third clock maintains a defined relationship with the network time from the second clock.

Example 98. The apparatus of Example 88, wherein the redundant time from the third clock maintains a defined relationship with the network time from the second clock, the defined relationship to comprise an approximate linear relationship.

Example 99. The apparatus of Example 88, wherein the third clock is implemented by the second device in the first network domain or a second network domain.

Example 100. The apparatus of Example 88, comprising means for storing the second set of timestamps for the events in the first network domain based on the redundant time from the third clock of the second device.

Example 101. The apparatus of Example 88, wherein the third clock is implemented by a third device in a second network domain separate from the first network domain.

Example 102. The apparatus of Example 88, comprising means for sending the events in the first network domain based on network time from the second clock of the second device to a third device in a second network domain separate from the first network domain.

Example 103. The apparatus of Example 88, comprising means for storing the second set of timestamps for the events in the first network domain based on the redundant time from the third clock by a third device in a second network domain separate from the first network domain.

Example 104. The apparatus Example 88, comprising means for receiving the second set of timestamps for the events in the first network domain based on the redundant time from the third clock of a third device in a second network domain separate from the first network domain, the second set of timestamps received by the second device from the third device.

Example 105. The apparatus of Example 88, comprising means for recovering the network time of the first network domain using the redundant time from the third clock as input for the regression model to output the recovered network time for the second clock of the second device by: means for receiving a current redundant time from the third clock in the second network domain not synchronized with the first and second clocks; means for calculating a recovered network time with the regression model; means for synchronizing the second clock of the second device to the recovered network time.

Example 106. The apparatus of Example 88, comprising means for determining to switch the second device from operating in the CF role to operating in the CL role for the first network domain.

Example 107. The apparatus of Example 88, comprising means for switching the second device from operating in the CF role to operating in the CL role for the first network domain.

Example 108. The apparatus of Example 88, comprising means for sending messages from the second device to a fourth device in the first network domain, the messages to comprise time information to synchronize the second clock for the second device and a fourth clock for the fourth device to the recovered network time, the second device to operate in the CL role and the fourth device to operate in the CF role.

Example 109. The computing-implemented method of Example 108, comprising: means for establishing a data stream between the second device and the fourth device in a first network domain, the data stream comprising a plurality of switching nodes; and means for receiving messages from the second device by the fourth device in the first network domain, the messages to comprise time information to synchronize the second clock for the second device and the fourth clock for the fourth device to the recovered network time.

Example 110. The computing-implemented method of Example 108, comprising means for determining an application for a fourth device in the first network domain is to correct a set of timestamps previously stored using the network time from a fourth clock of the fourth device, the fourth clock previously synchronized to the first clock of the first device.

Example 111. The computing-implemented method of Example 108, comprising means for receiving a regression model from the second device by the fourth device in the first network domain.

Example 112. The computing-implemented method of Example 108, comprising: means for receiving the first and second set of timestamps by the fourth device in the first network domain; and means for constructing a regression model based on the first and second set of timestamps by the fourth device.

Example 113. The computing-implemented method of Example 108, comprising means for correcting a timestamp for an application for a fourth device in the first network domain using a regression model received from the second device by the fourth device.

Example 114. The computing-implemented method of Example 108, comprising means for storing a corrected timestamp for an application for a fourth device in the first network domain using a regression model received from the second device by the fourth device.

Example 115. The computing-implemented method of Example 108, comprising means for determining a checkpoint for the fourth device based on a message from an intrusion detection system (IDS)

Example 116. The computing-implemented method of Example 108, comprising means for rolling back the recovered network time by a cumulative amount of frequency and phase corrections of the network time for the fourth clock of the fourth device.

Example 117. The computing-implemented method of Example 108, comprising correcting a timestamp for an application for a fourth device in the first network domain using a regression model received from the second device by the fourth device.

Although techniques using, and apparatuses for implementing, network time recovery and application timestamp recovery in a TSN have been described in language specific to features or methods, it is to be understood that the subject of the appended claims is not necessarily limited to the specific features or methods described. Rather, the specific features and methods are disclosed as example ways in which network time recovery and application timestamp recovery in a TSN can be implemented.

What is claimed is:

1. An apparatus, comprising:
    a processing circuitry;
    a memory coupled to the processing circuitry, the memory to store instructions that when executed by the processing circuitry causes the processing circuitry to:
    establish a data stream between a first device and a second device in a first network domain, the data stream comprising a plurality of switching nodes;
    receive messages from the first device by the second device in the first network domain, the messages to comprise time information to synchronize a first clock for the first device and a second clock for the second device to a network time for the first network domain;
    determine the second clock is to recover the network time for the second device without new messages from the first device;
    retrieve a first set of timestamps previously stored for events in the first network domain using the network time from the second clock;
    retrieve a second set of timestamps previously stored for the events in the first network domain using a redundant time from a third clock, wherein the third clock is not synchronized with the first and second clocks;
    construct a regression model based on the first and second set of timestamps; and
    recover the network time of the first network domain using a redundant time from the third clock as input for the regression model to output a recovered network time for the second clock of the second device.

2. The apparatus of claim 1, the processing circuitry to establish the data stream in accordance with the Institute of Electrical and Electronics Engineers (IEEE) 802.1AS and/or 802.1Qbv and/or 1588 standards.

3. The apparatus of claim 1, wherein the messages are synchronization messages or follow up messages for a precision time protocol (PTP).

4. The apparatus of claim 1, wherein the first device operates in a clock leader (CL) role and the second device operates in a clock follower (CF) role.

5. The apparatus of claim 1, the processing circuitry to determine the second clock is to recover the network time for the second device without new messages from the first device when the messages are not received by the second device for a defined time interval.

6. The apparatus of claim 1, the processing circuitry to store the first set of timestamps for events in the first network domain based on the network time from the second clock by the second device.

7. The apparatus of claim 1, the processing circuitry to recover the network time of the first network domain using the redundant time from the third clock as input for the regression model to output the recovered network time for the second clock of the second device, the processing circuitry to: receive a current redundant time from the third clock in the second network domain not synchronized with the first and second clocks; calculate a recovered network time with the regression model; synchronize the second clock of the second device to the recovered network time.

8. The apparatus of claim 1, the processing circuitry to send messages from the second device to a fourth device in the first network domain, the messages to comprise time information to synchronize the second clock for the second device and a fourth clock for the fourth device to the recovered network time, the second device to operate in the CL role and the fourth device to operate in the CF role.

9. A computing-implemented method, comprising:
establishing a data stream between a first device and a second device in a first network domain, the data stream comprising a plurality of switching nodes;
receiving messages from the first device by the second device in the first network domain, the messages to comprise time information to synchronize a first clock for the first device and a second clock for the second device to a network time for the first network domain;
determining the second clock is to recover the network time for the second device without new messages from the first device;
retrieving a first set of timestamps previously stored for events in the first network domain using the network time from the second clock;
retrieving a second set of timestamps previously stored for the events in the first network domain using a redundant time from a third clock, wherein the third clock is not synchronized with the first and second clocks;
constructing a regression model based on the first and second set of timestamps; and
recovering the network time of the first network domain using a redundant time from the third clock as input for the regression model to output a recovered network time for the second clock of the second device.

10. The computing-implemented method of claim 9, wherein the first device operates in a clock leader (CL) role and the second device operates in a clock follower (CF) role.

11. The computing-implemented method of claim 9, determining the second clock is to recover the network time for the second device without new messages from the first device in response to a message indicating the first device is under a security attack and placed in isolation from the first network domain.

12. The computing-implemented method of claim 9, wherein the redundant time from the third clock maintains a defined relationship with the network time from the second clock, the defined relationship to comprise an approximate linear relationship.

13. The computing-implemented method of claim 9, comprising storing the second set of timestamps for the events in the first network domain based on the redundant time from the third clock by a third device in a second network domain separate from the first network domain.

14. The computing-implemented method of claim 9, comprising recovering the network time of the first network domain using the redundant time from the third clock as input for the regression model to output the recovered network time for the second clock of the second device by: receiving a current redundant time from the third clock in the second network domain not synchronized with the first and second clocks; calculating a recovered network time with the regression model; synchronizing the second clock of the second device to the recovered network time.

15. The computing-implemented method of claim 9, comprising switching the second device from operating in the CF role to operating in the CL role for the first network domain.

16. The computing-implemented method of claim 9, comprising sending messages from the second device to a fourth device in the first network domain, the messages to comprise time information to synchronize the second clock for the second device and a fourth clock for the fourth device to the recovered network time, the second device to operate in the CL role and the fourth device to operate in the CF role.

17. A non-transitory computer-readable storage device, storing instructions that when executed by processing circuitry of a manager of a time sensitive network (TSN), cause the manager to:
receive messages from the first device by the second device in the first network domain, the messages to comprise time information to synchronize a first clock for the first device and a second clock for the second device to a network time for the first network domain;
determine the second clock is to recover the network time for the second device without new messages from the first device;
retrieve a first set of timestamps previously stored for events in the first network domain using the network time from the second clock;
retrieve a second set of timestamps previously stored for the events in the first network domain using a redundant time from a third clock, wherein the third clock is not synchronized with the first and second clocks;
construct a regression model based on the first and second set of timestamps; and
recover the network time of the first network domain using a redundant time from the third: clock as input for the regression model to output a recovered network time for the second clock of the second device.

18. The computer-readable storage medium of claim 17, the instructions, when executed by the processing circuitry, cause the manager to establish the data stream in accordance with the Institute of Electrical and Electronics Engineers (IEEE) 802.1AS and/or 802.1Qbv and/or 1588 standards.

19. The computer-readable storage medium of claim 17, wherein the messages are synchronization messages or follow up messages for a precision time protocol (PTP).

20. The computer-readable storage medium of claim 17, wherein the first device operates in a clock leader (CL) role and the second device operates in a clock follower (CF) role.

21. The computer-readable storage medium of claim 17, the instructions, when executed by the processing circuitry, cause the manager to determine the second clock is to recover the network time for the second device without new messages from the first device when the messages are not received by the second device for a defined time interval.

22. The computer-readable storage medium of claim 17, the instructions, when executed by the processing circuitry, cause the manager to store the first set of timestamps for events in the first network domain based on the network time from the second clock by the second device.

23. The computer-readable storage medium of claim 17, wherein the redundant time from the third clock maintains a defined relationship with the network time from the second clock, the defined relationship to comprise an approximate linear relationship.

24. The computer-readable storage medium of claim 17, the instructions, when executed by the processing circuitry, cause the manager to store the second set of timestamps for the events in the first network domain based on the redundant time from the third clock of the second device.

* * * * *